(12) United States Patent
Wang

(10) Patent No.: US 11,280,428 B2
(45) Date of Patent: Mar. 22, 2022

(54) PNEUMATIC TRIP VALVE

(71) Applicant: Easytork Automation Corporation, Maryland Heights, MO (US)

(72) Inventor: George Wang, Maryland Heights, MO (US)

(73) Assignee: EASYTORK AUTOMATION CORPORATION, Maryland Heights, MO (US)

( * ) Notice: Subject to any disclaimer, the term of this patent is extended or adjusted under 35 U.S.C. 154(b) by 0 days.

(21) Appl. No.: 17/000,331

(22) Filed: Aug. 23, 2020

(65) Prior Publication Data

US 2021/0054947 A1  Feb. 25, 2021

Related U.S. Application Data

(60) Provisional application No. 62/890,331, filed on Aug. 22, 2019.

(51) Int. Cl.
*F16K 31/143* (2006.01)
*F16K 31/06* (2006.01)
*F16K 27/02* (2006.01)

(52) U.S. Cl.
CPC ........ *F16K 31/143* (2013.01); *F16K 27/0209* (2013.01); *F16K 27/0263* (2013.01); *F16K 31/0603* (2013.01)

(58) Field of Classification Search
CPC ............... F16K 31/143; F16K 31/0603; F16K 27/0263; F16K 27/0209
See application file for complete search history.

(56) References Cited

U.S. PATENT DOCUMENTS

| 2,497,633 | A | | 2/1950 | Shapiro et al. |
| 4,354,524 | A | * | 10/1982 | Higgins ............... F15B 21/02 |
| | | | | 137/624.14 |
| 2006/0287116 | A1 | | 12/2006 | White |
| 2008/0153605 | A1 | | 6/2008 | Liao |
| 2011/0226124 | A1 | | 9/2011 | Wang et al. |
| 2012/0156081 | A1 | | 6/2012 | Wang |
| 2017/0096908 | A1 | * | 4/2017 | Pacelli et al. ......... F15B 19/005 |

OTHER PUBLICATIONS

International Search Report and Written Opinion relating to International Application No. PCT/US2020/062926, dated Mar. 4, 2020; 10 pgs.

* cited by examiner

*Primary Examiner* — Kevin L Lee
(74) *Attorney, Agent, or Firm* — Polsinelli PC

(57) ABSTRACT

A pneumatic trip valve that may include a valve structure, a switch plate air path and an internal check valve. In various aspects, the pneumatic trip valve may be connected to a valve positioner, an actuator, or a combination thereof to control the operation of a fluid process control valve. In operation, the Pneumatic trip valve acts to put the actuator in a preset fail-safe position when the actuator loses sufficient pressure or communication from a main air supply, stored pressurized air from an actuator air reservoir, and/or an external air reservoir.

34 Claims, 34 Drawing Sheets

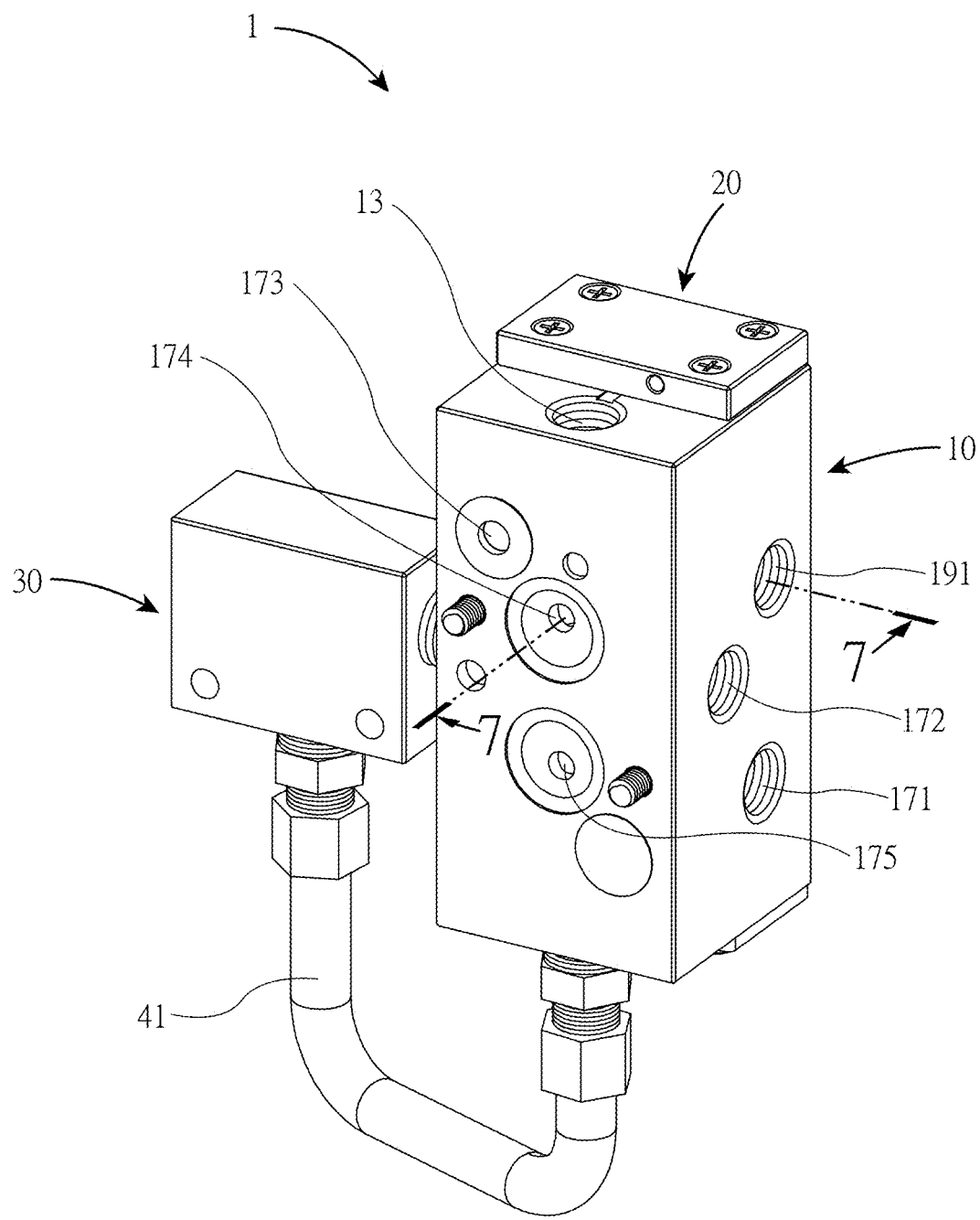
【Figure 1】

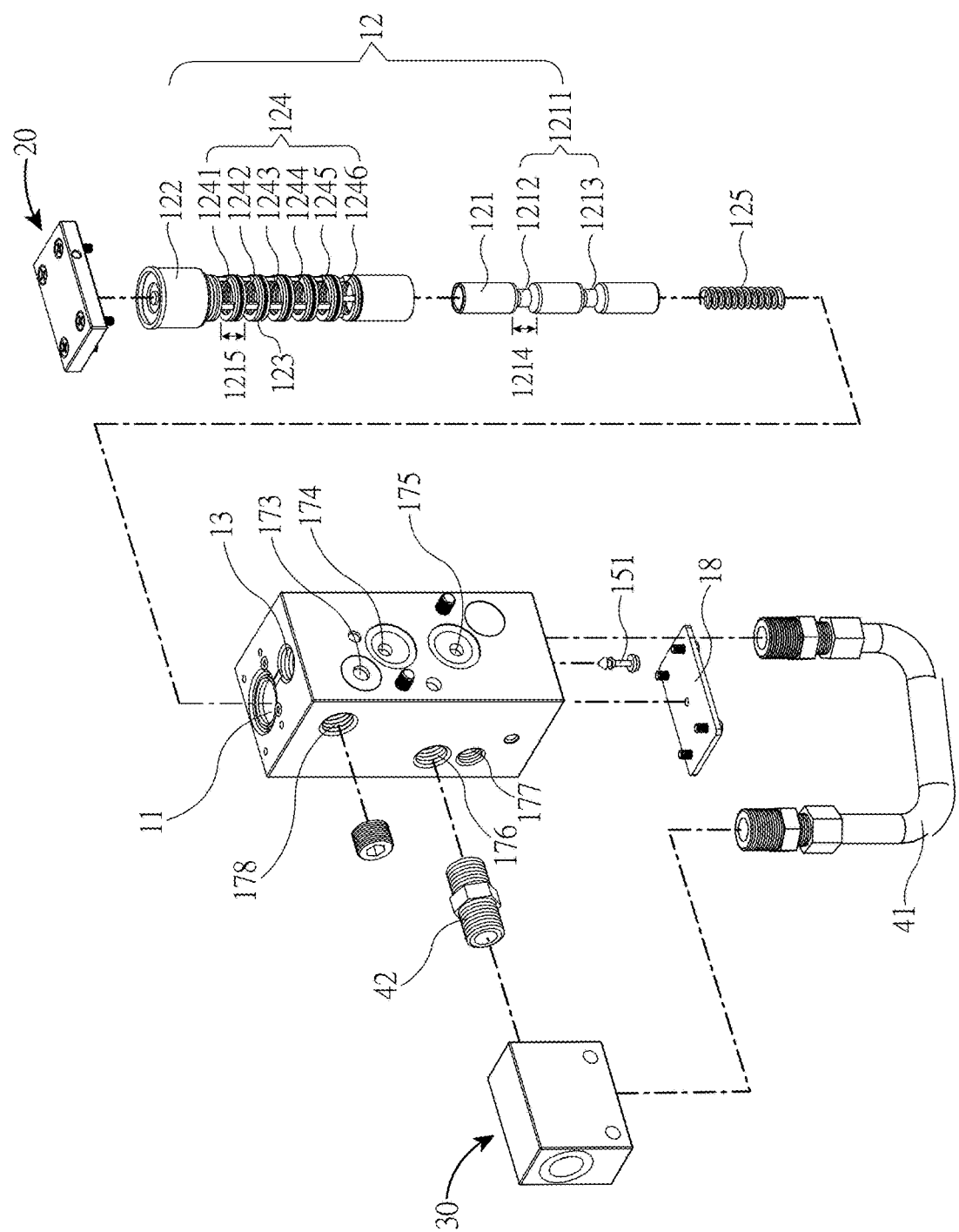
[Figure 2]

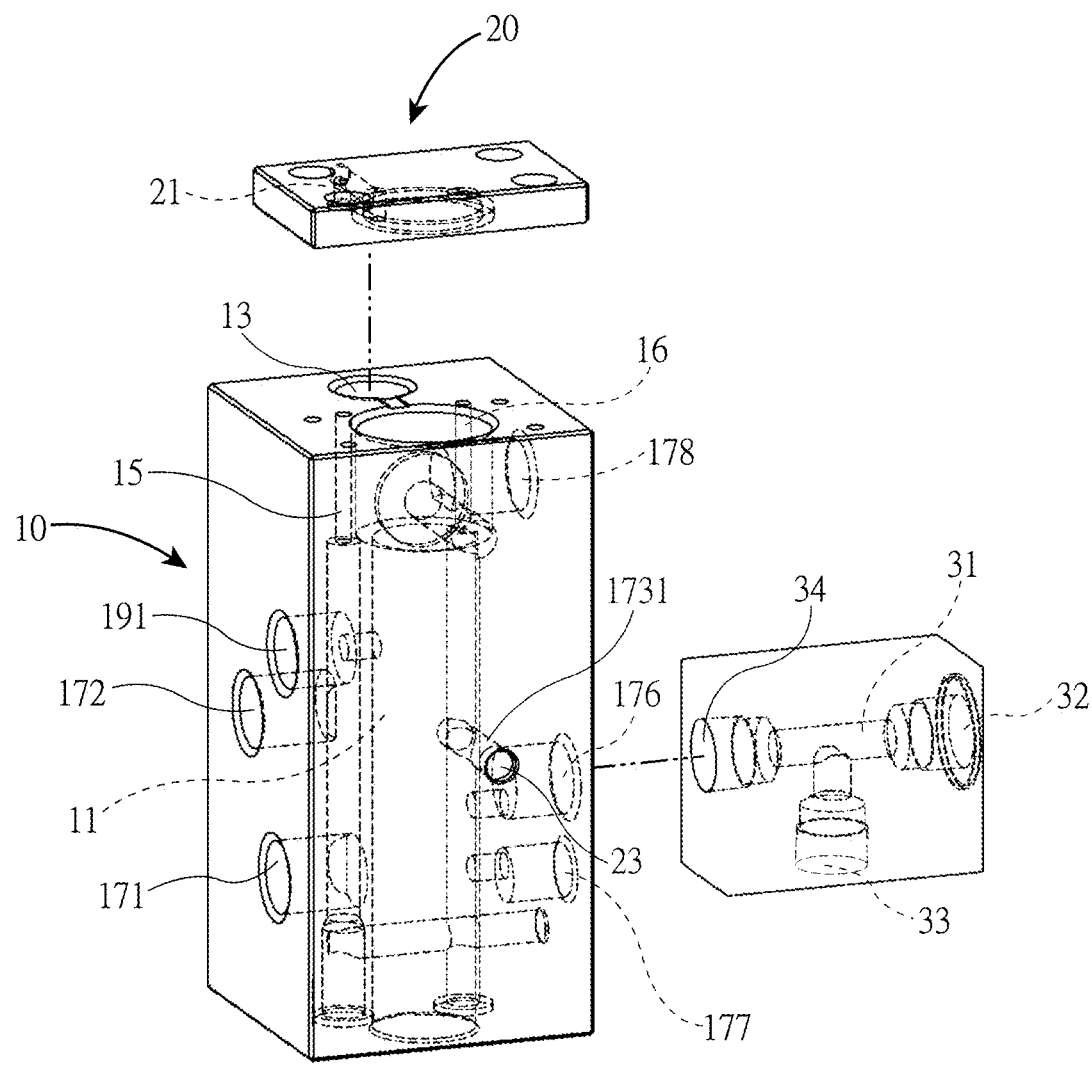
【Figure 3】

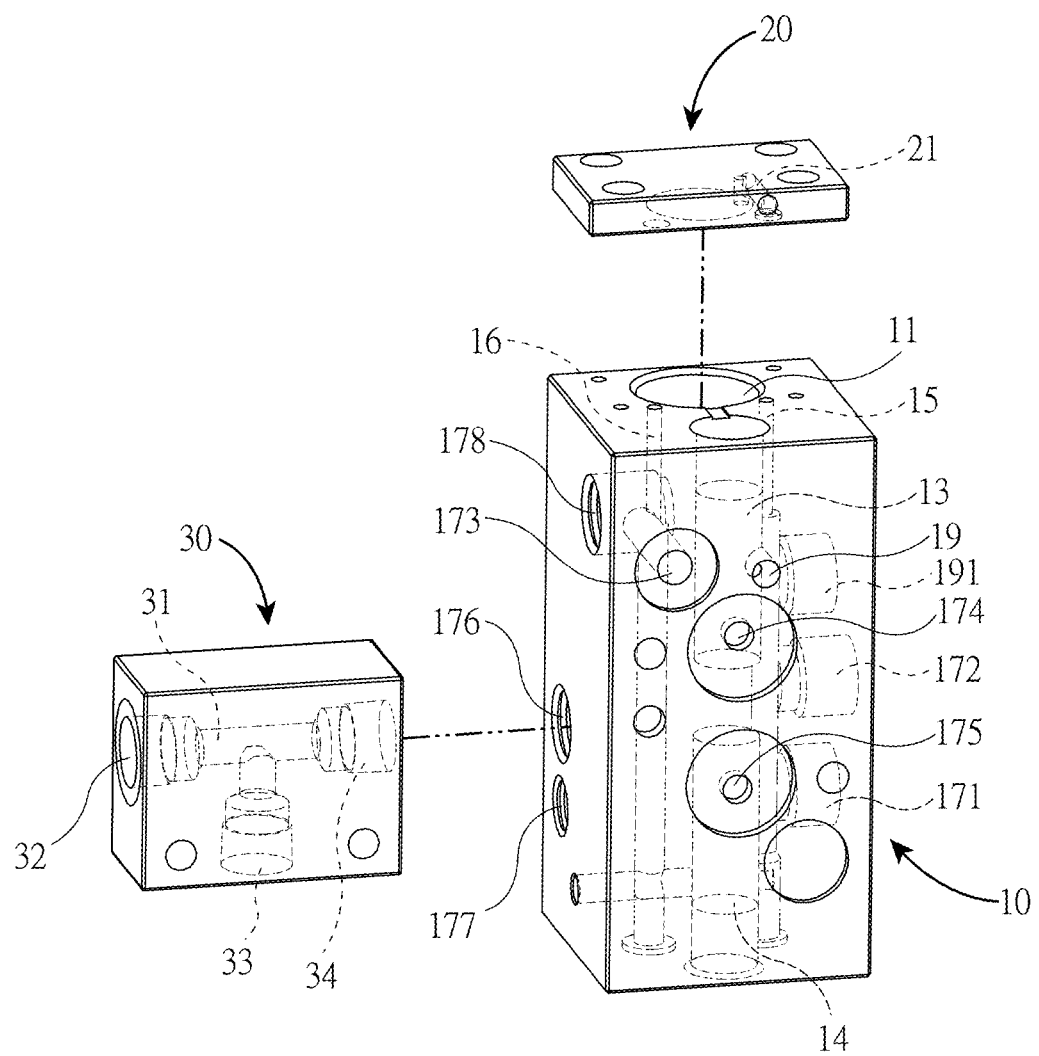
【Figure 4】

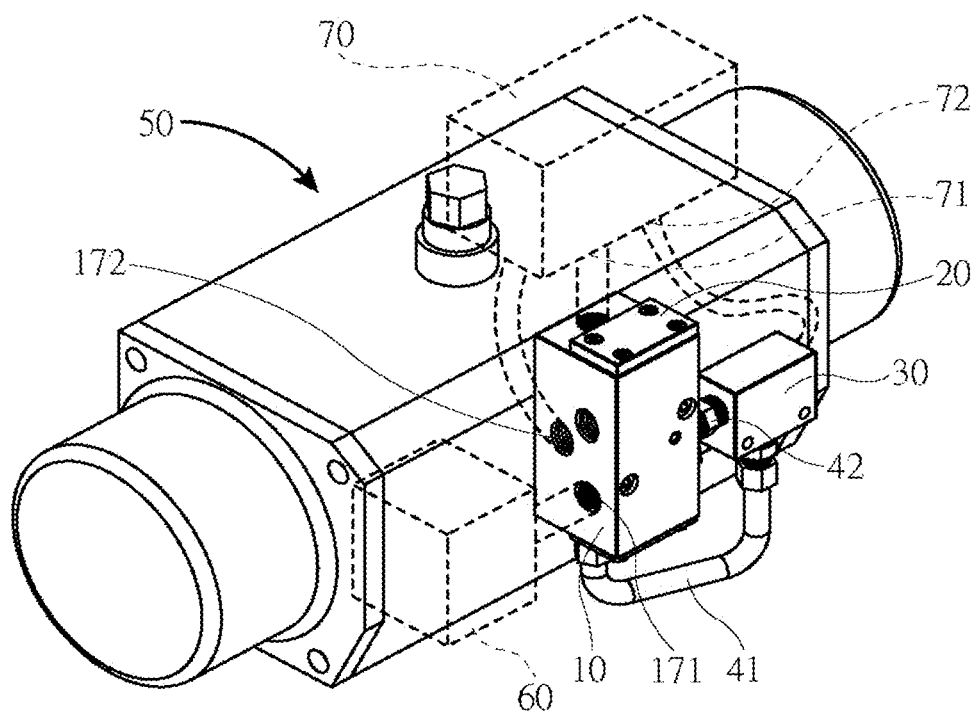
【Figure 5】
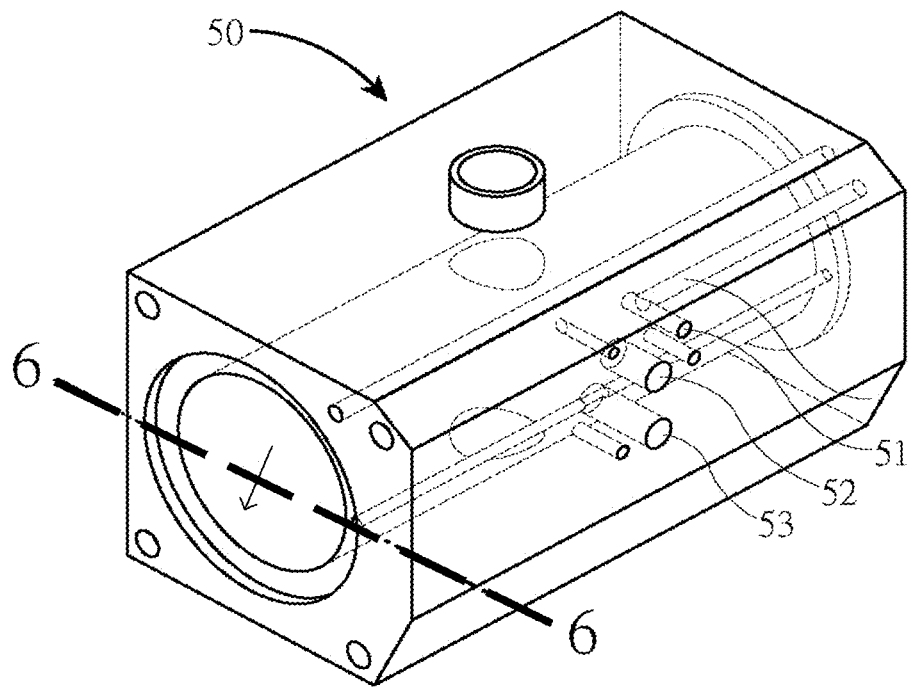
【Figure 6】

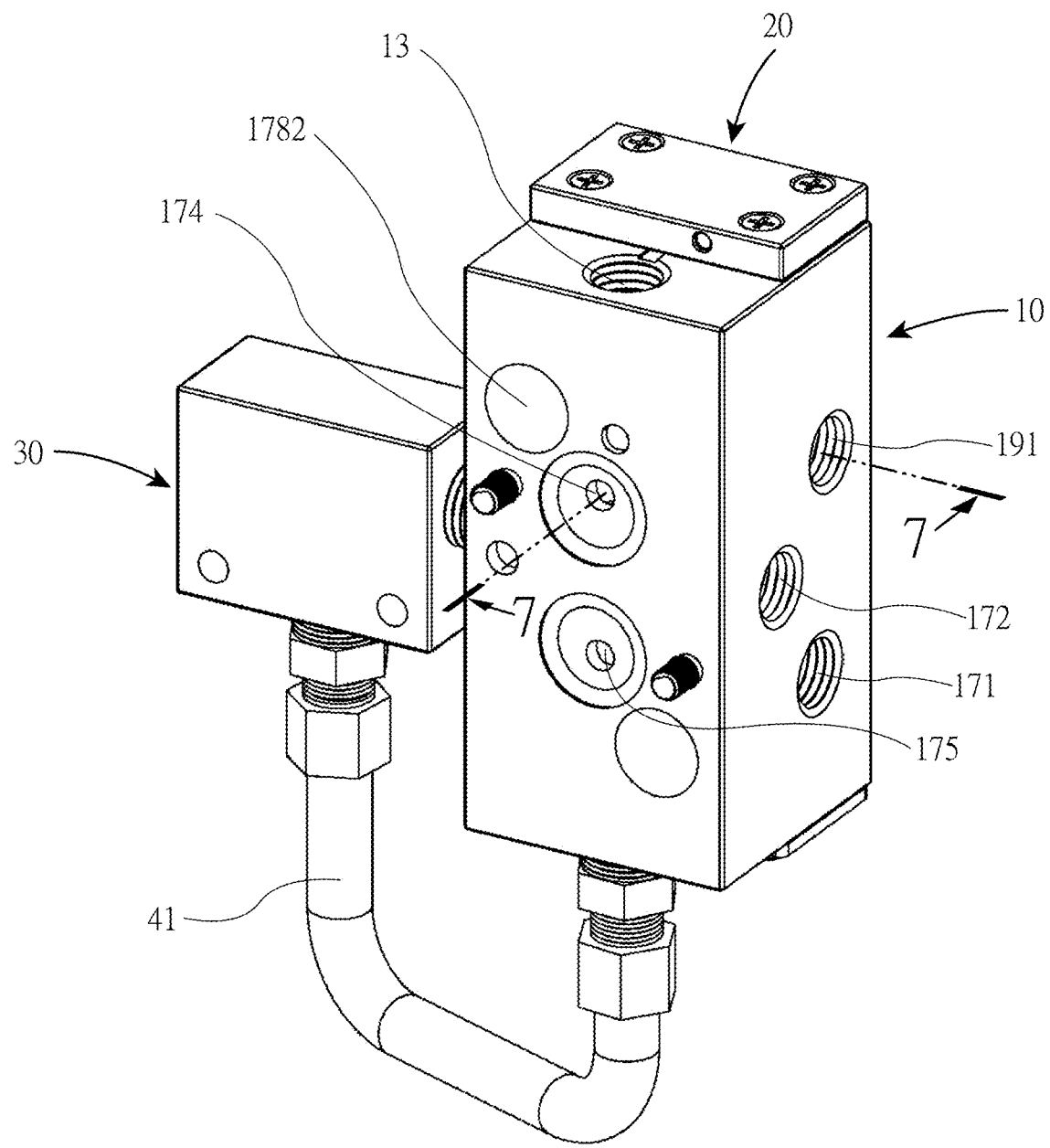
【Figure 7】

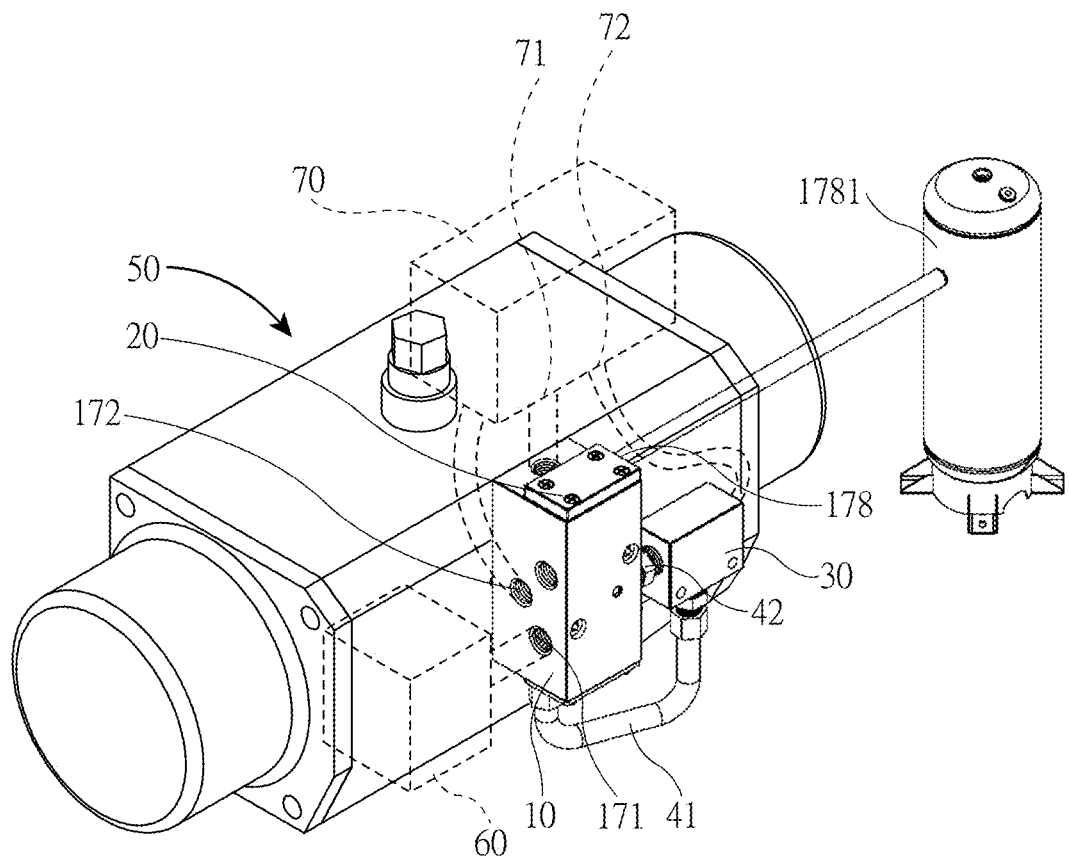
【Figure 8】

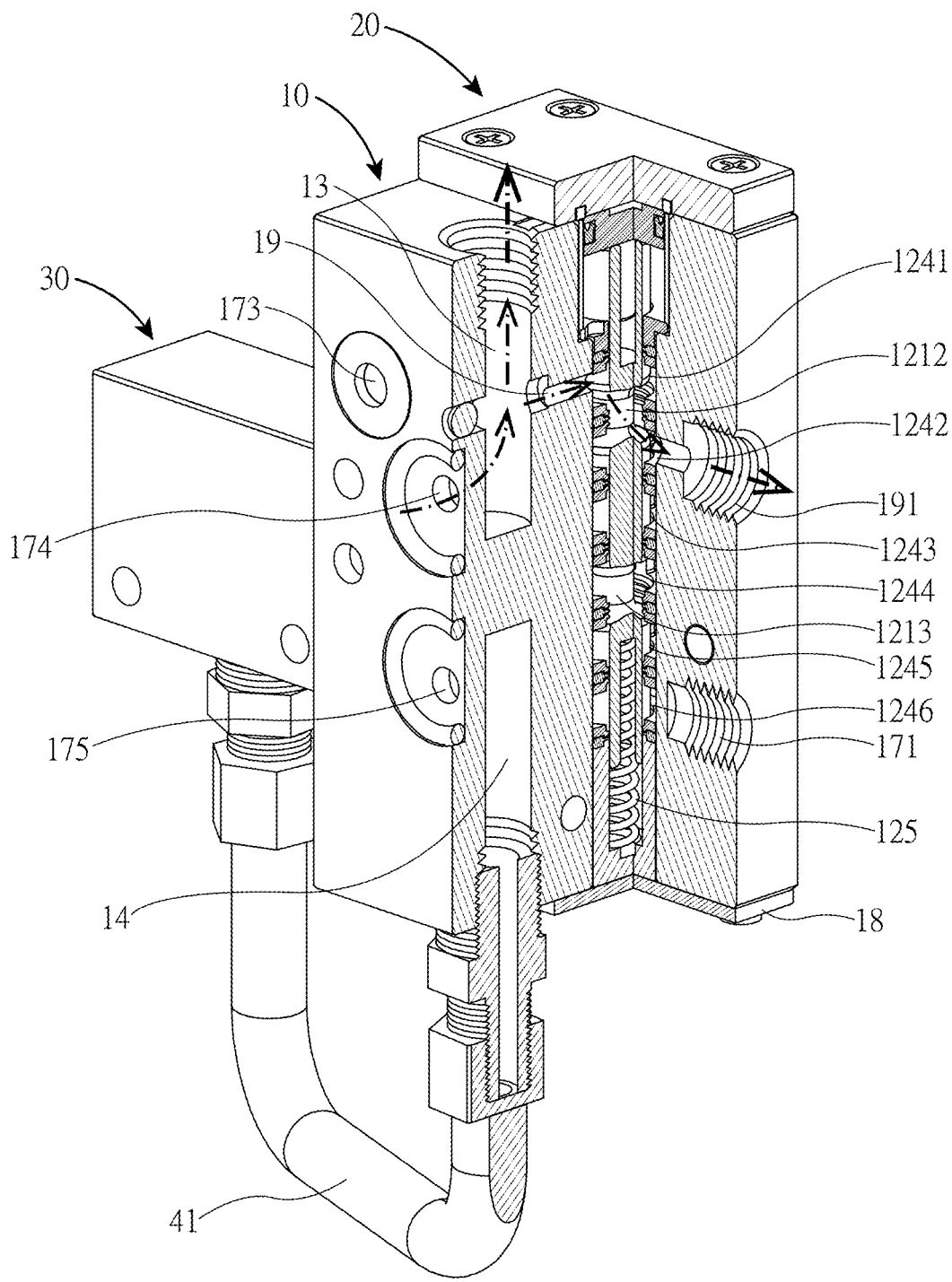
【Figure 9】

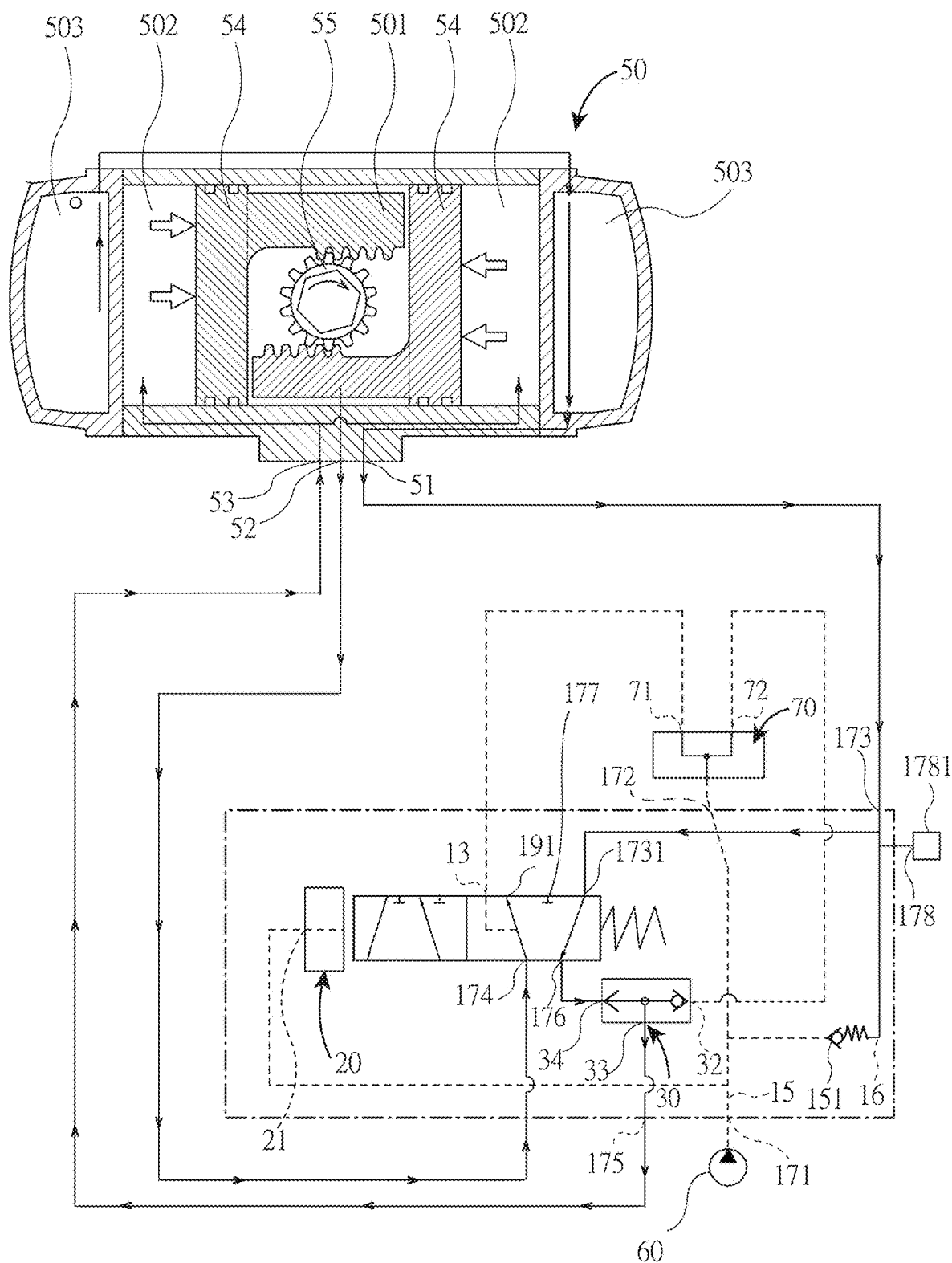
【Figure 10】

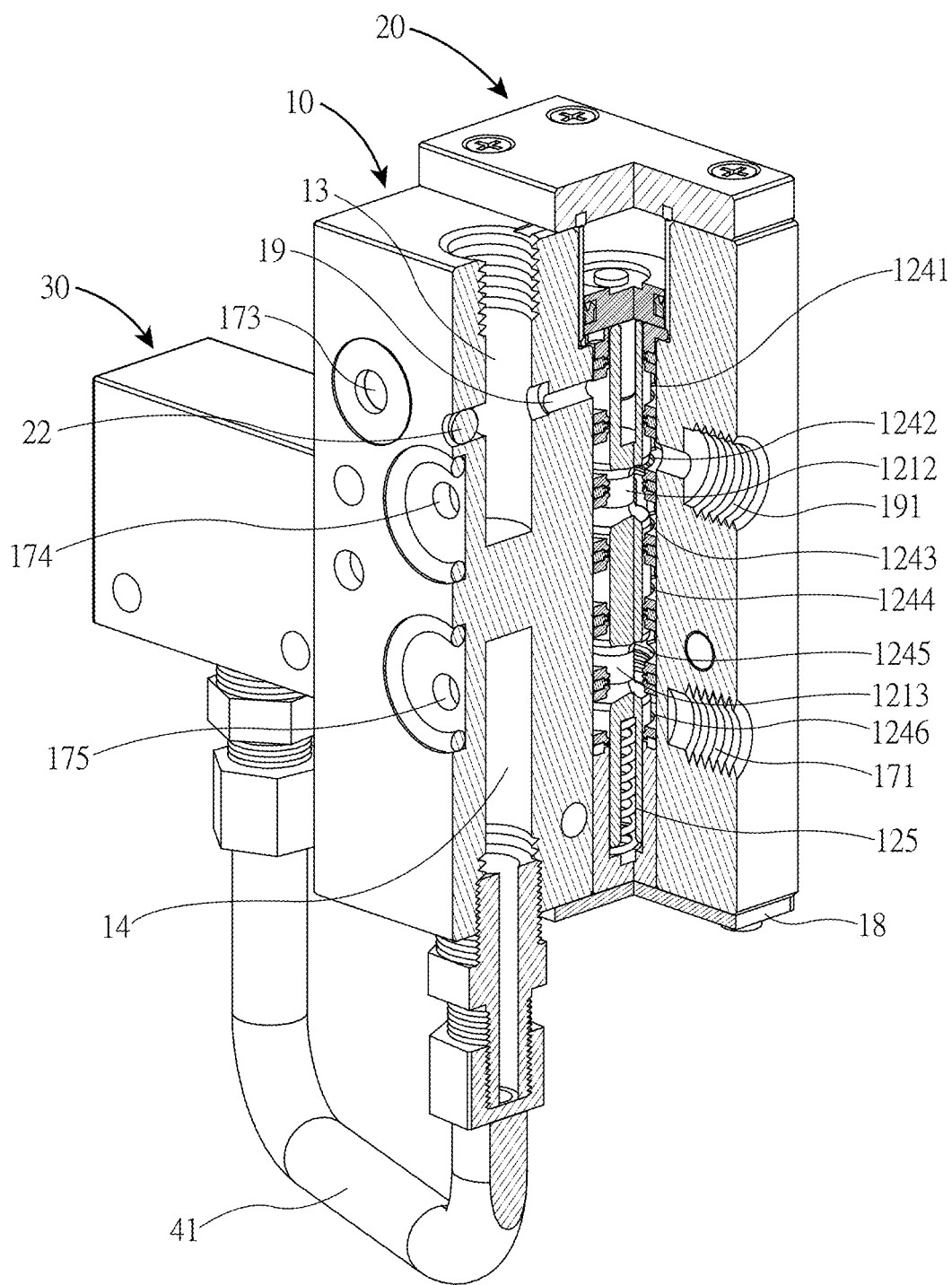
【Figure 11】

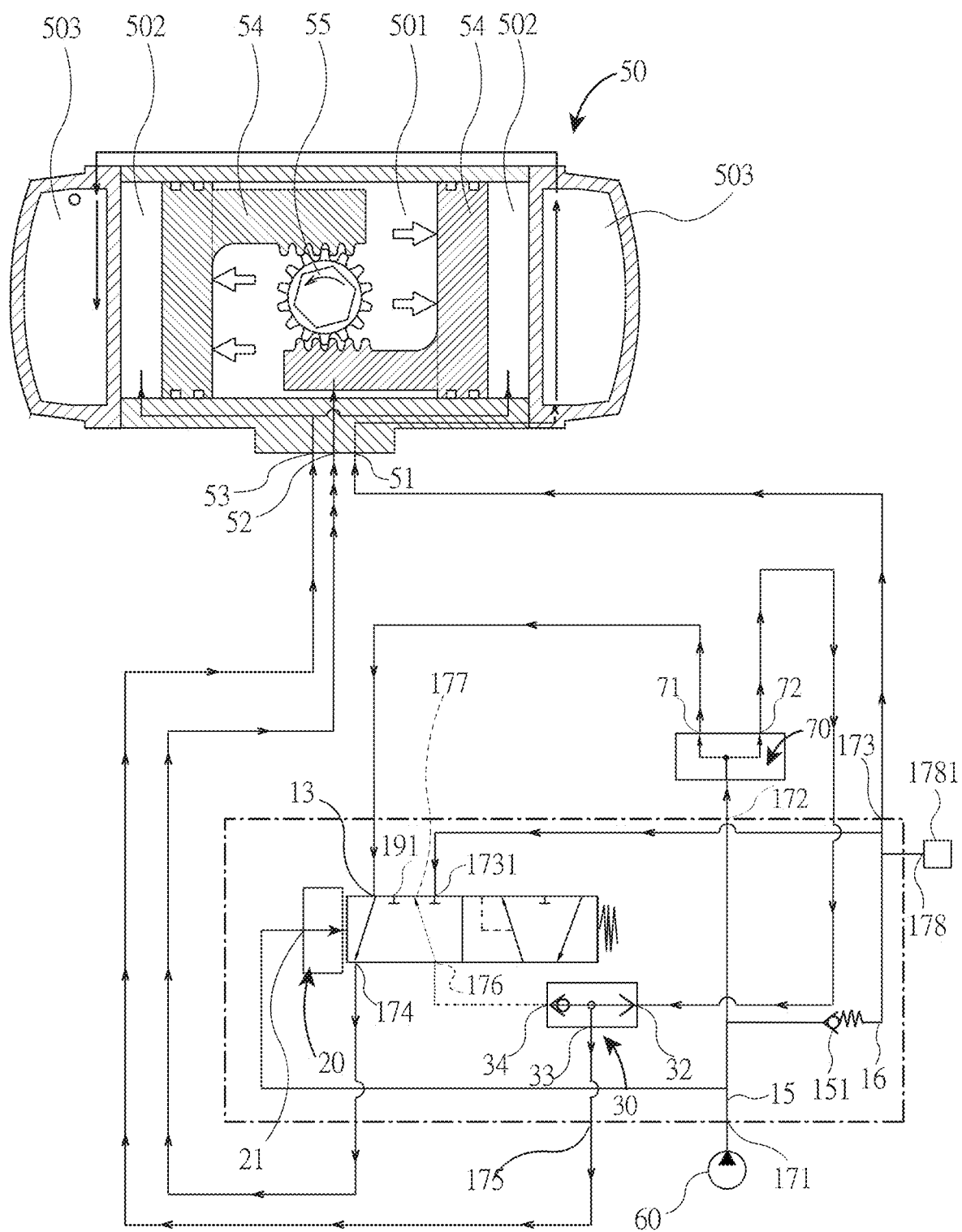
【Figure 12】

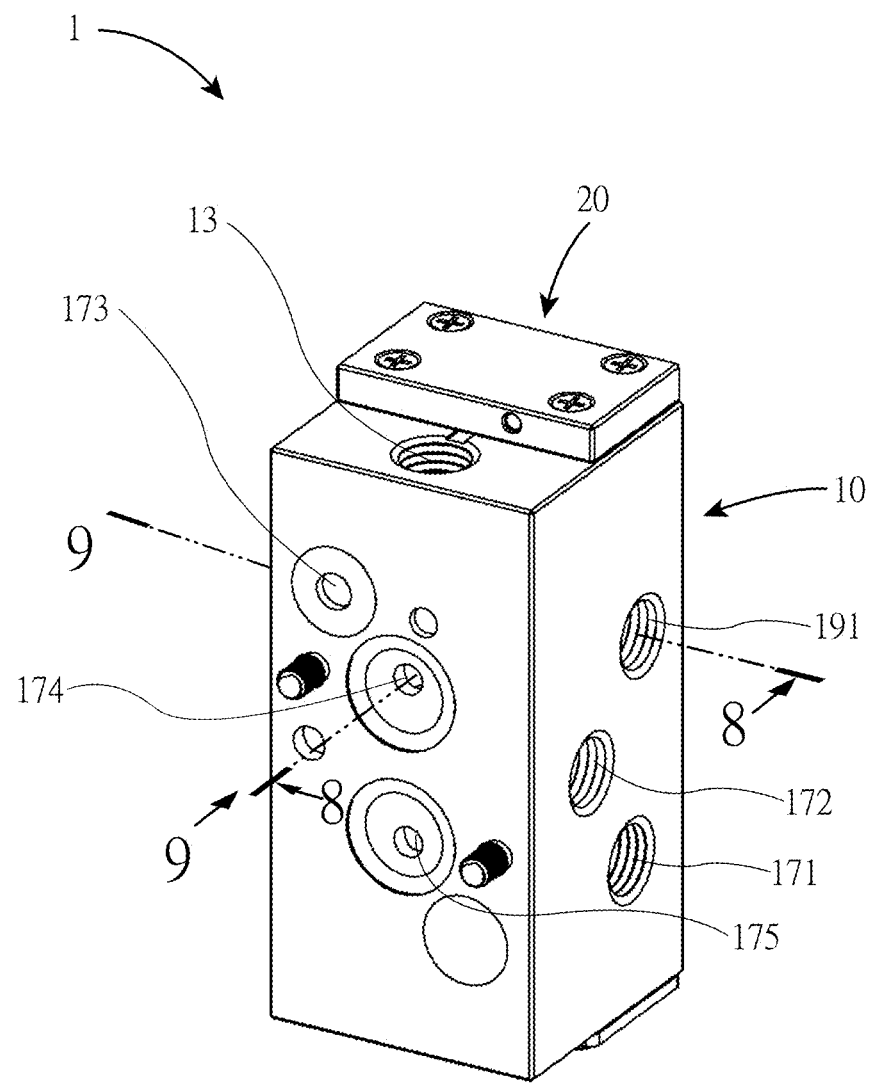
【Figure 13】

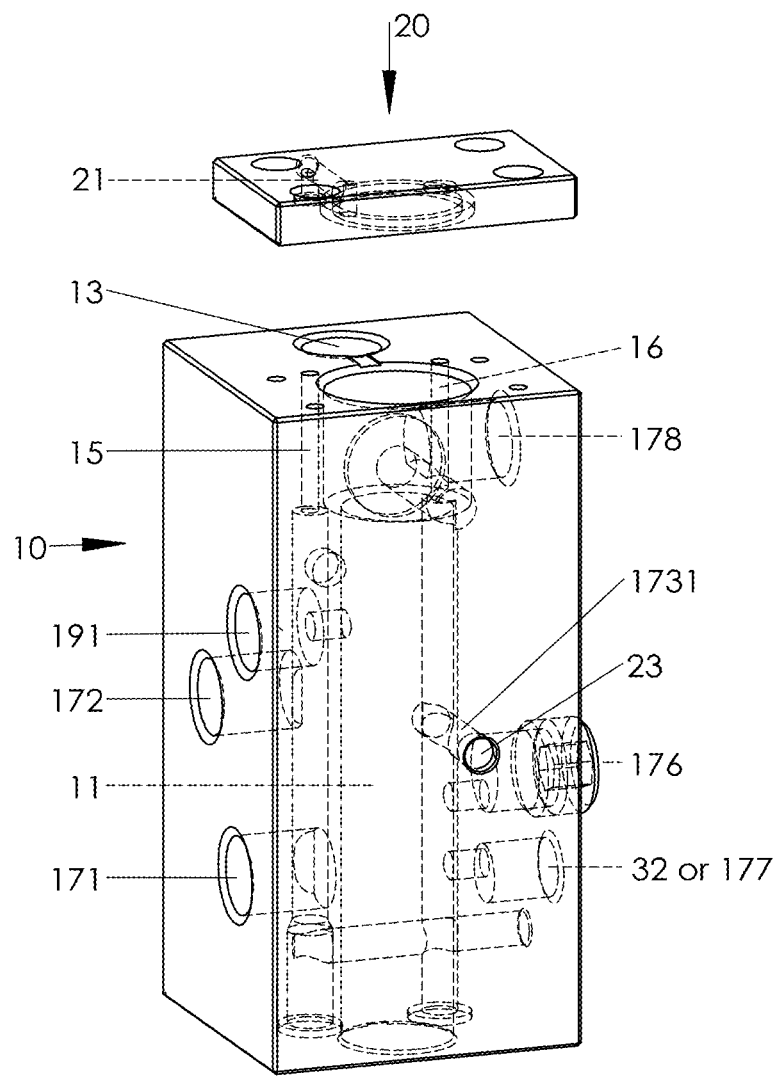
【Figure 14】

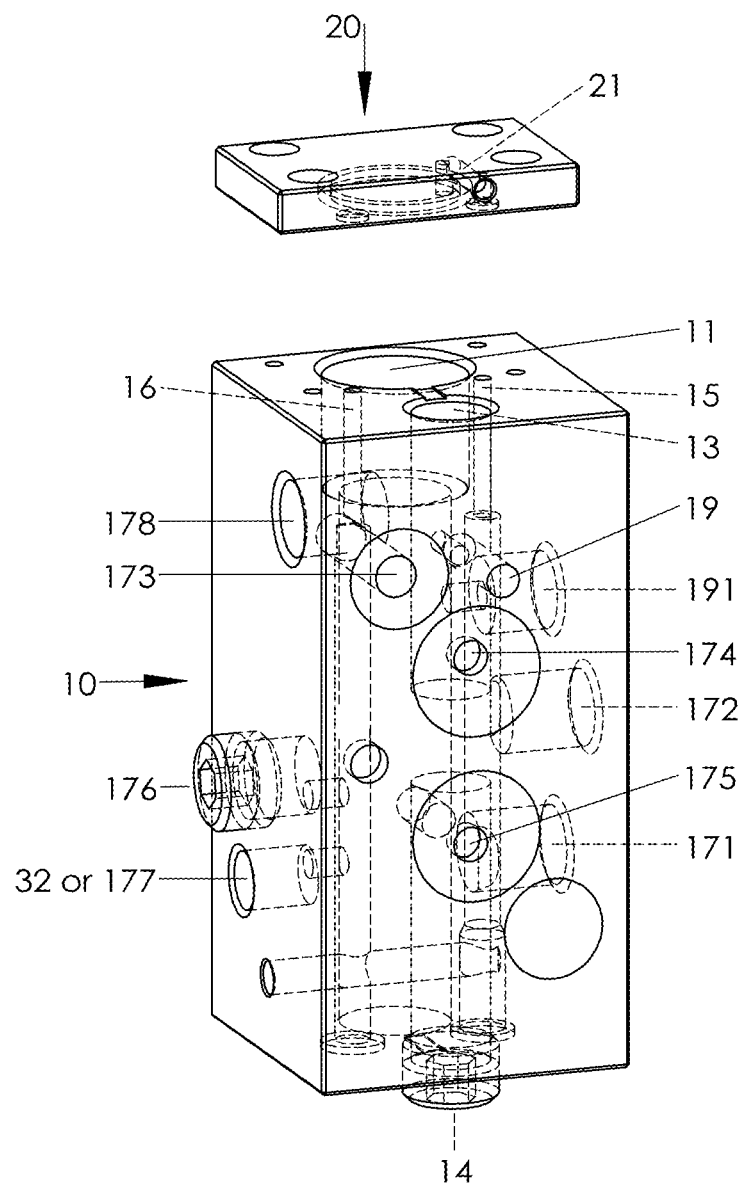
[Figure 15]

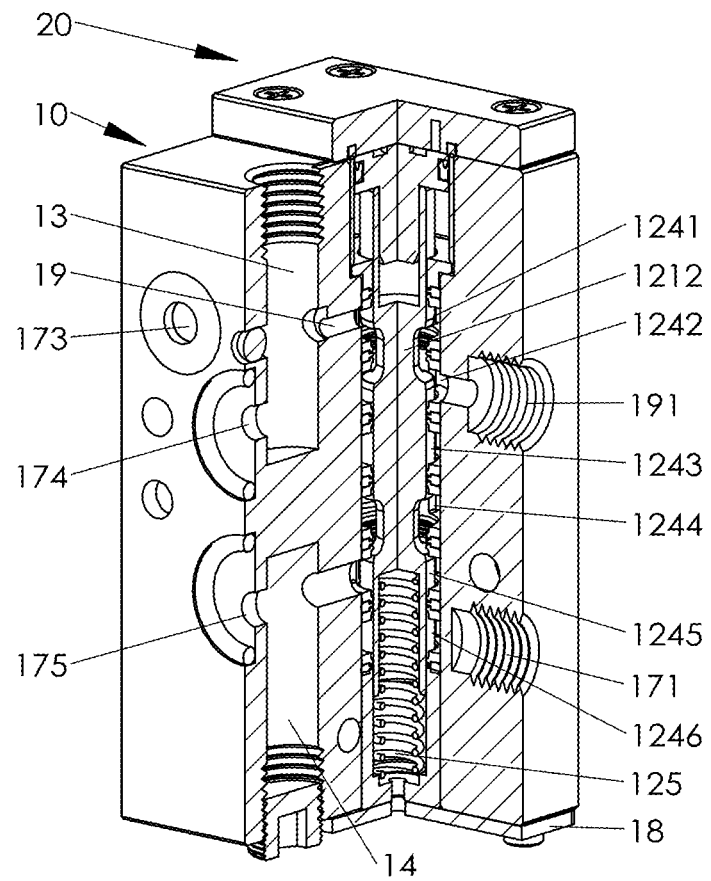
【Figure 16】

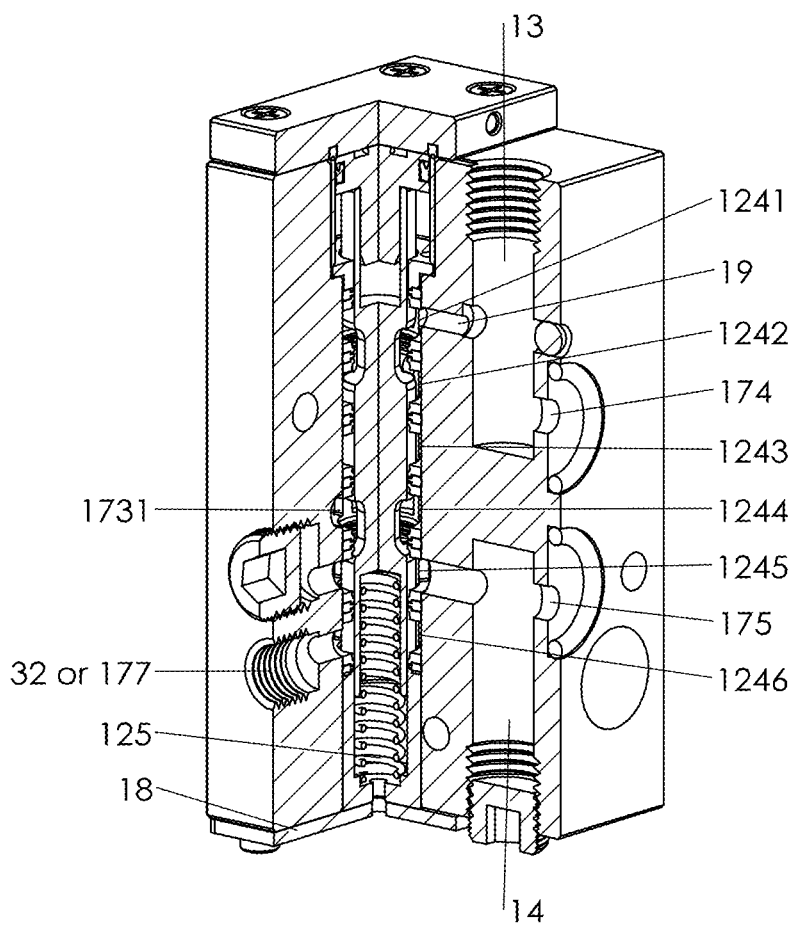
[Figure 17]

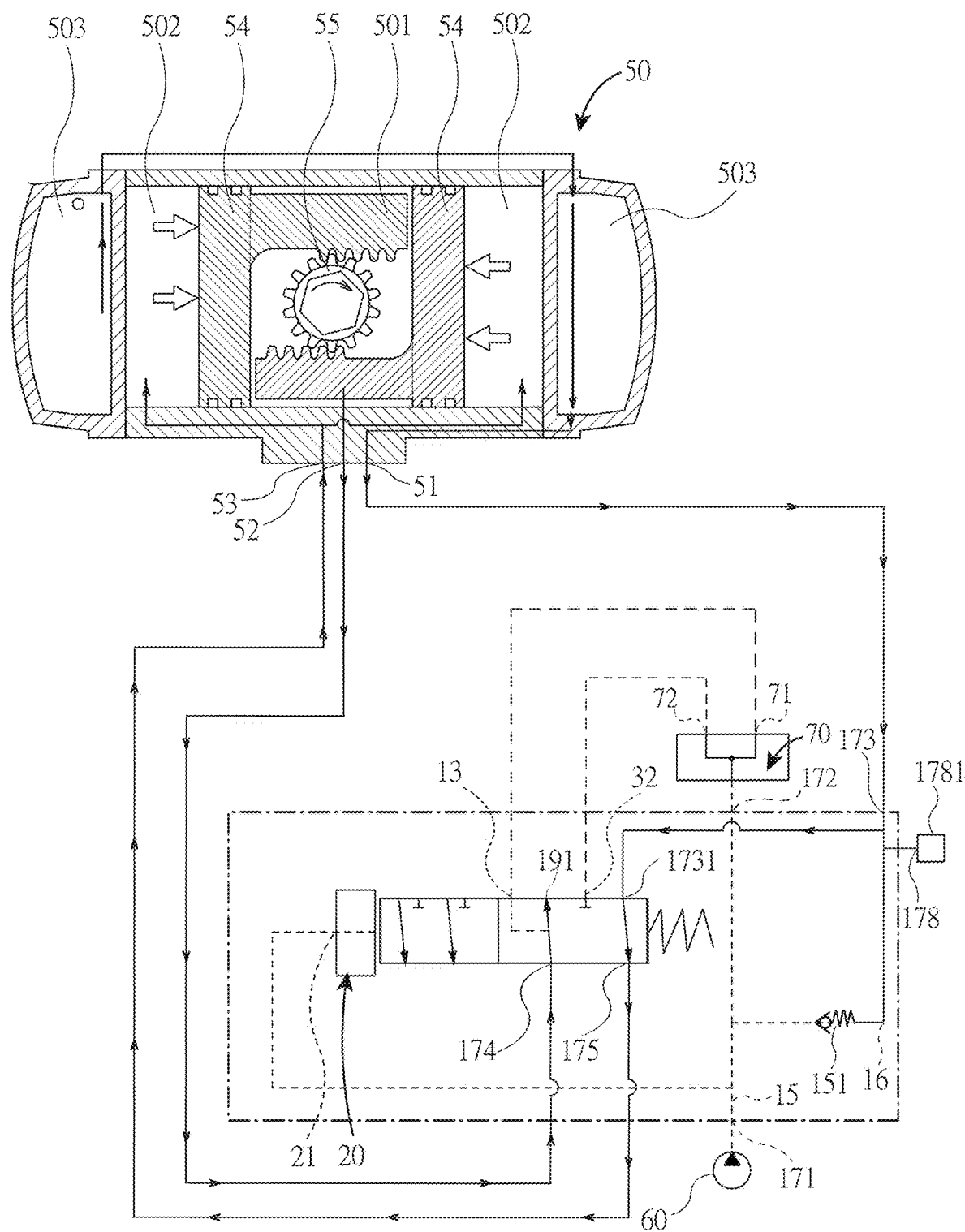
【Figure 18】

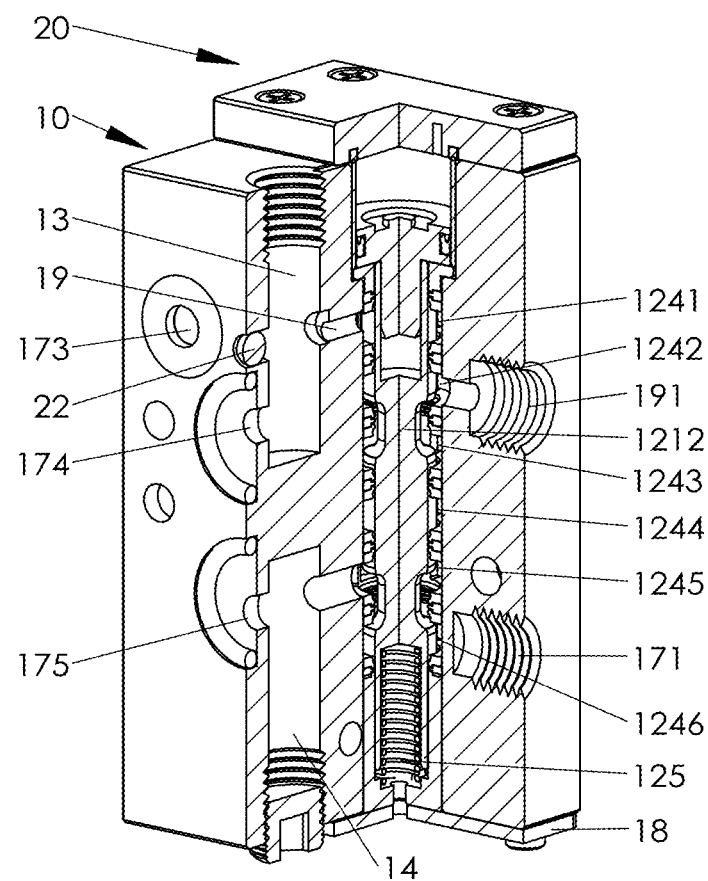
[Figure 19]

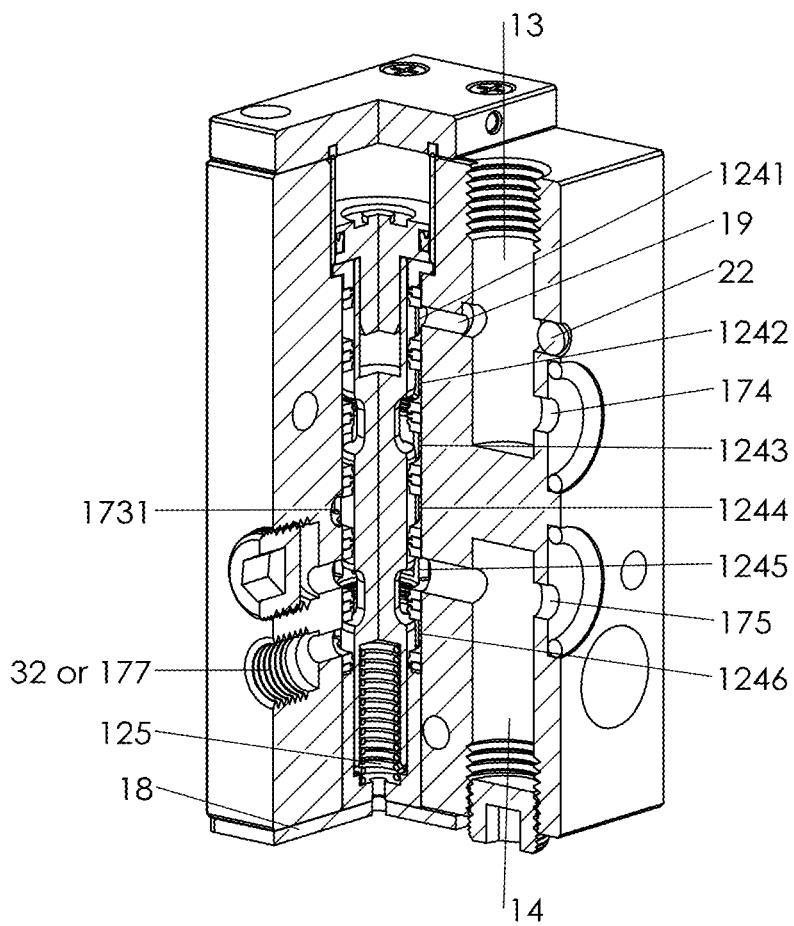
【Figure 20】

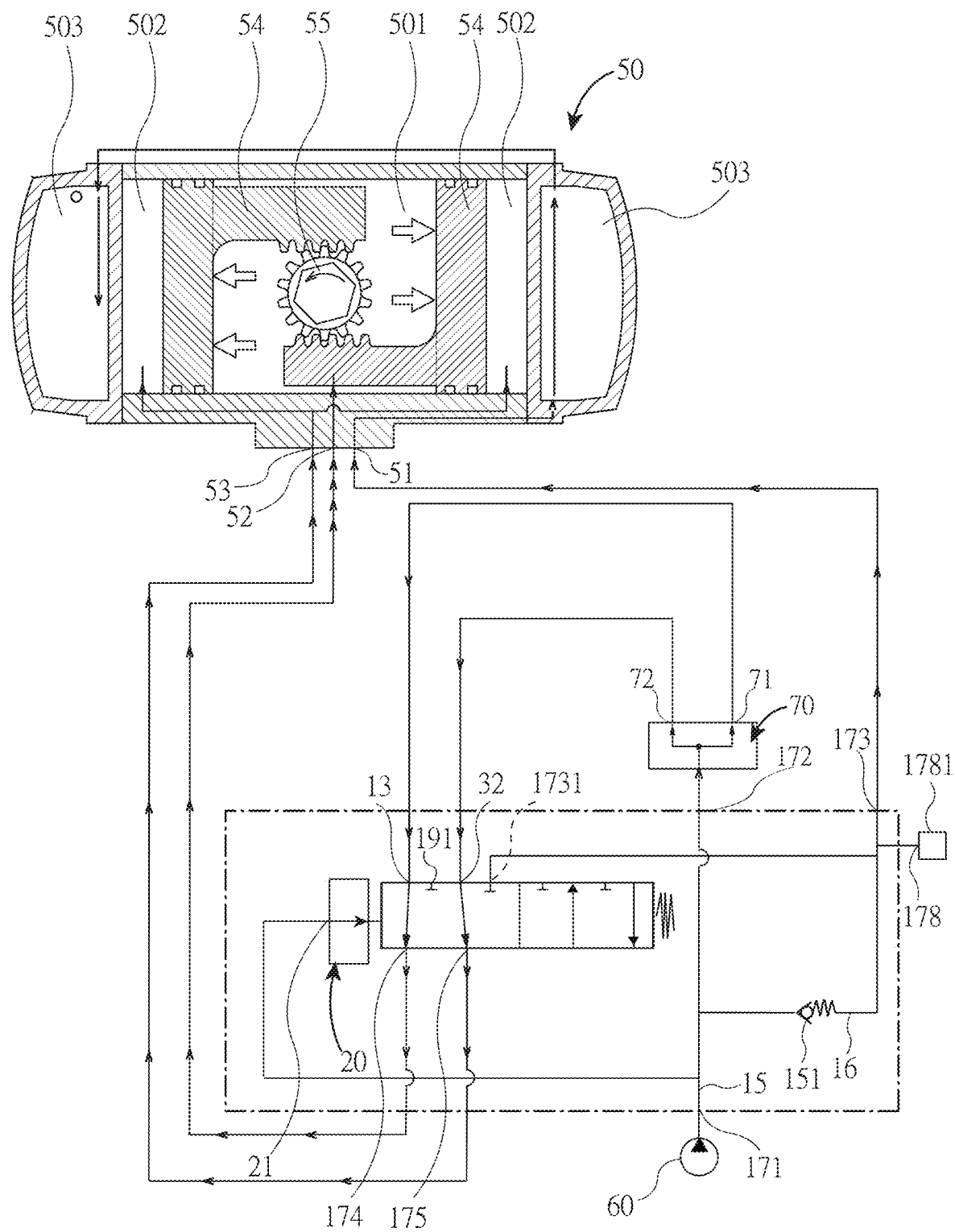
[Figure 21]

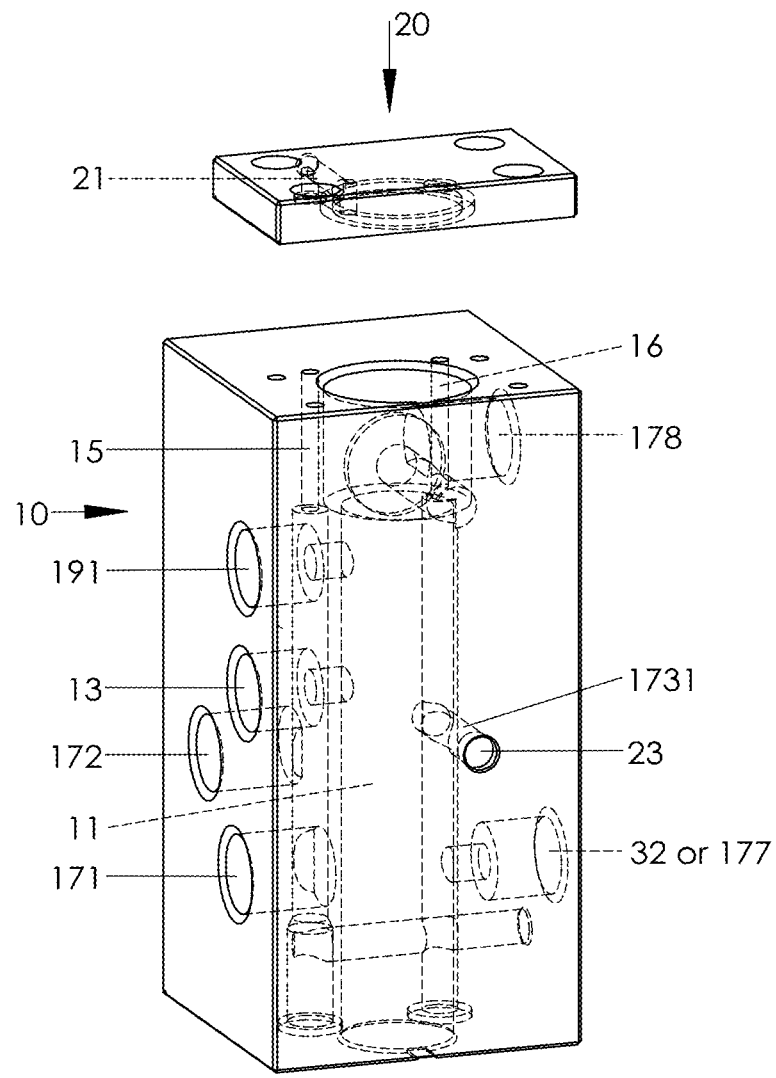
【Figure 22】

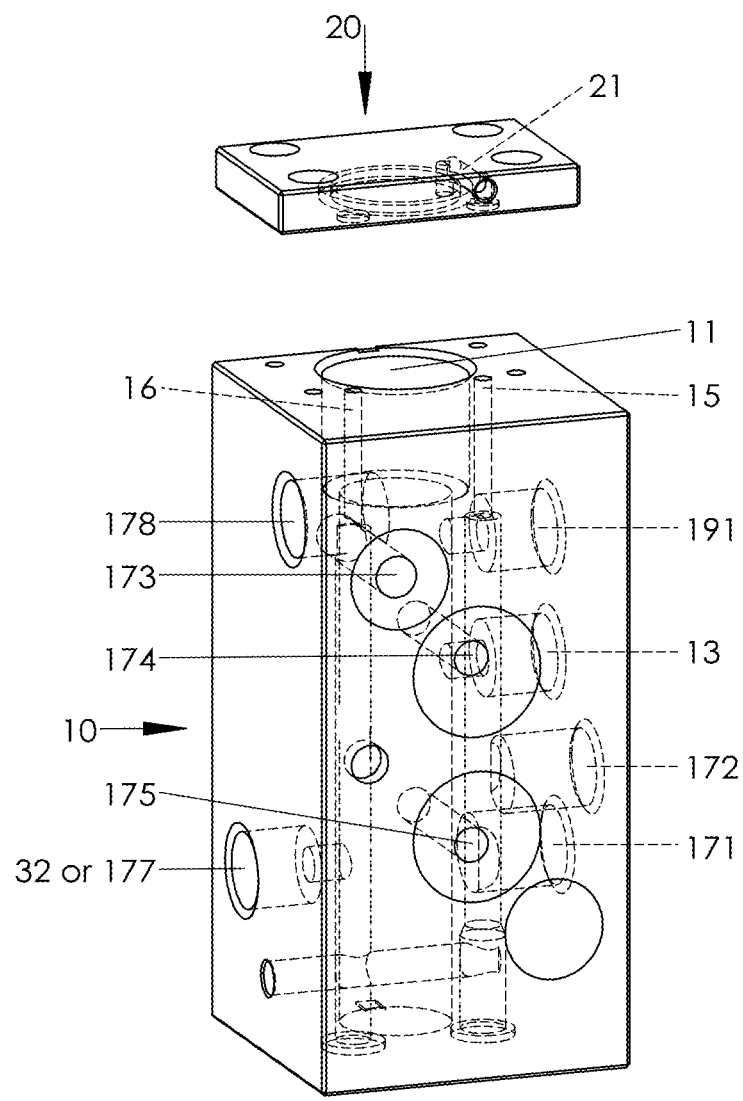
【Figure 23】

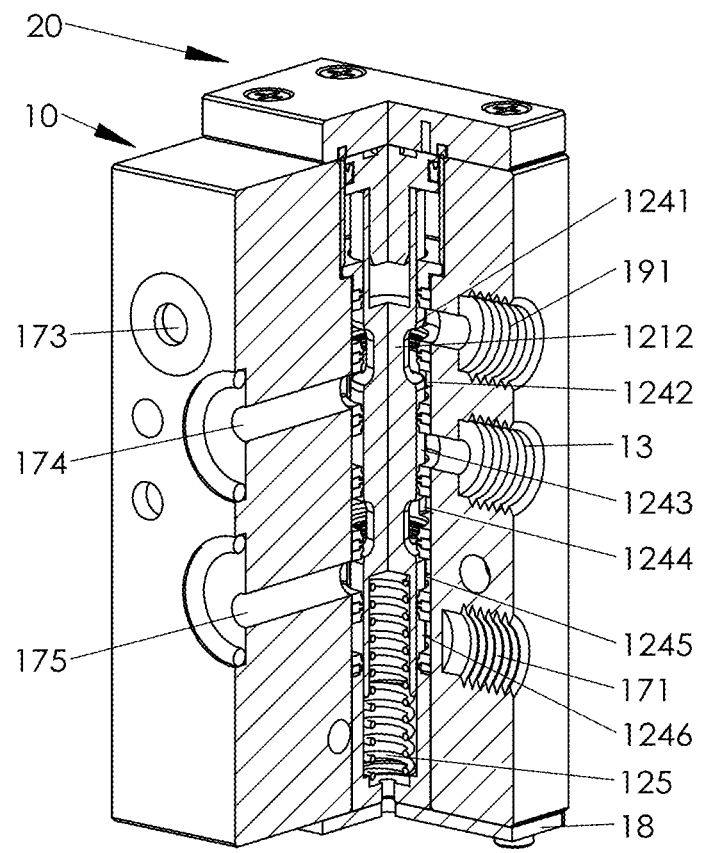
【Figure 24】

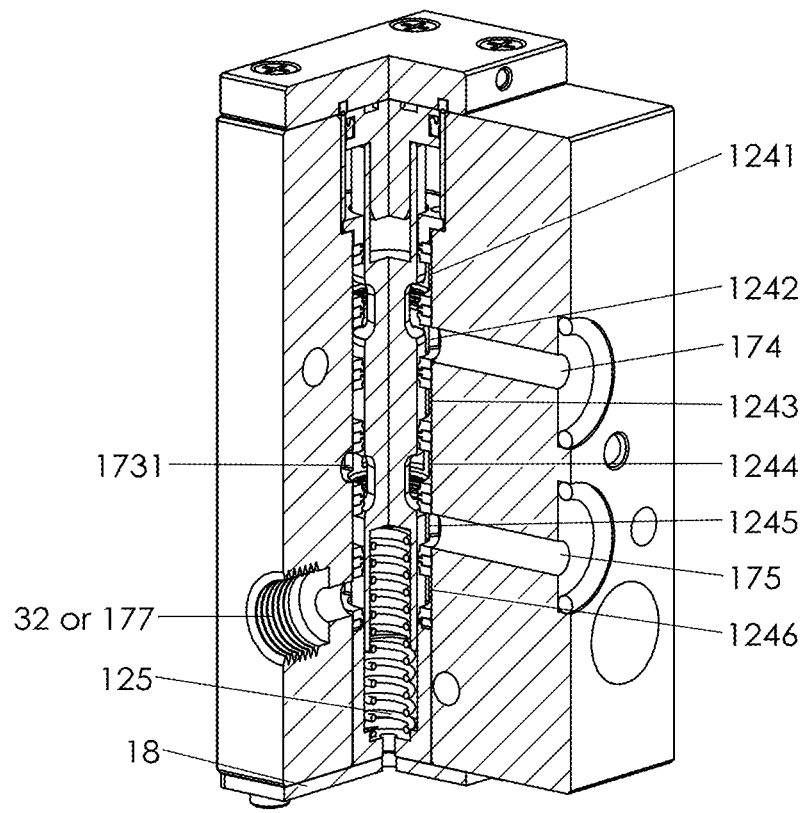
【Figure 25】

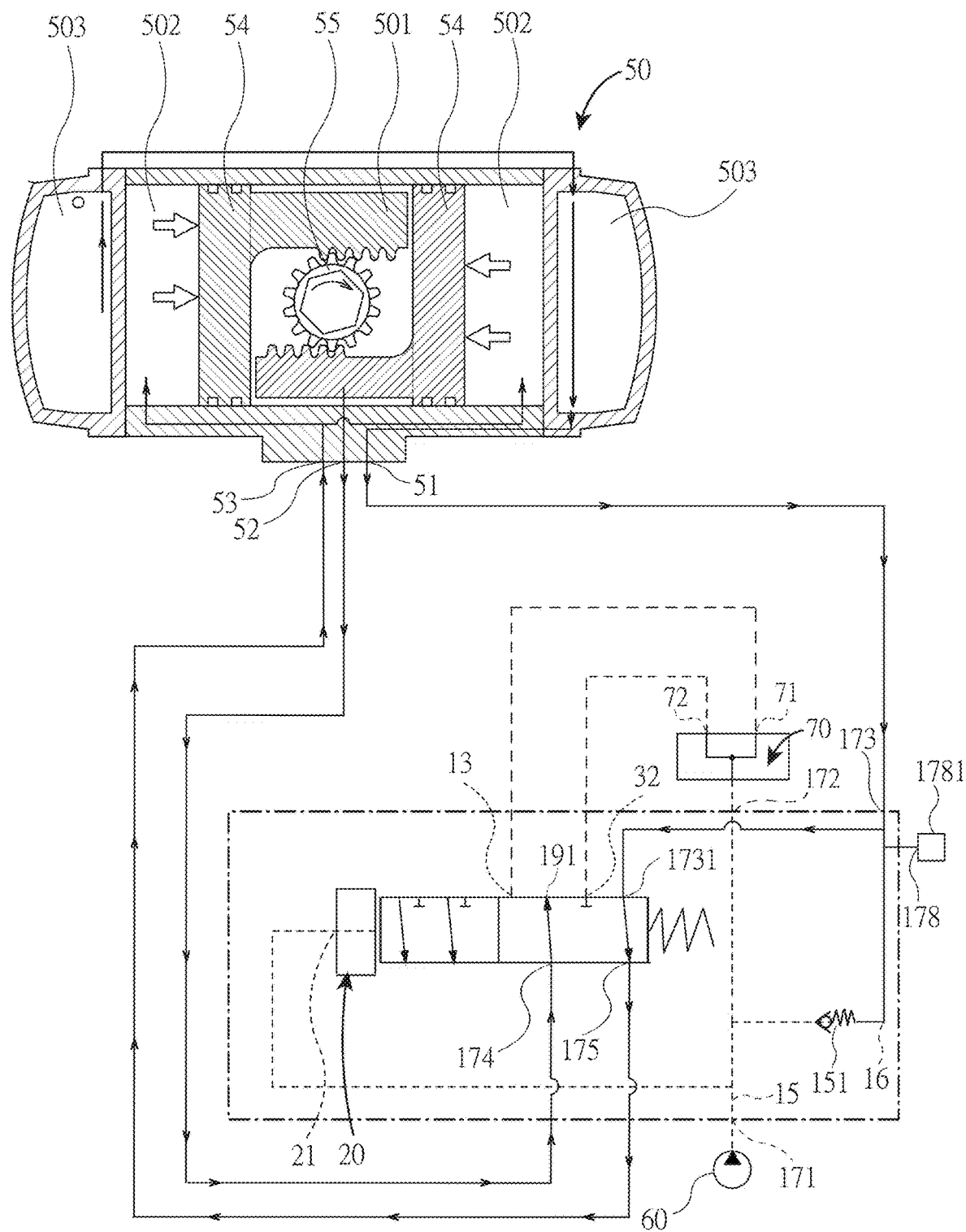
【Figure 26】

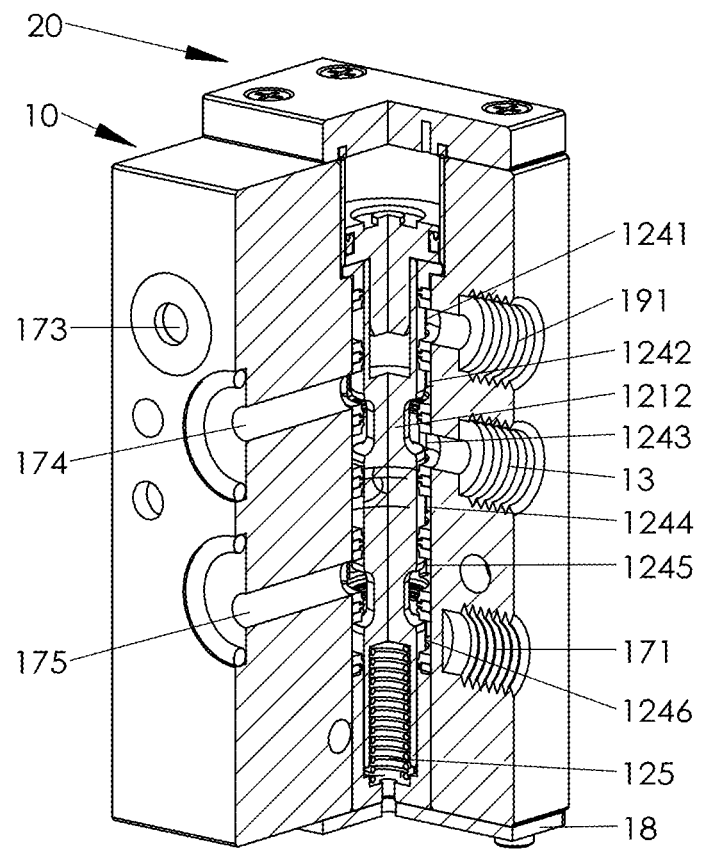
【Figure 27】

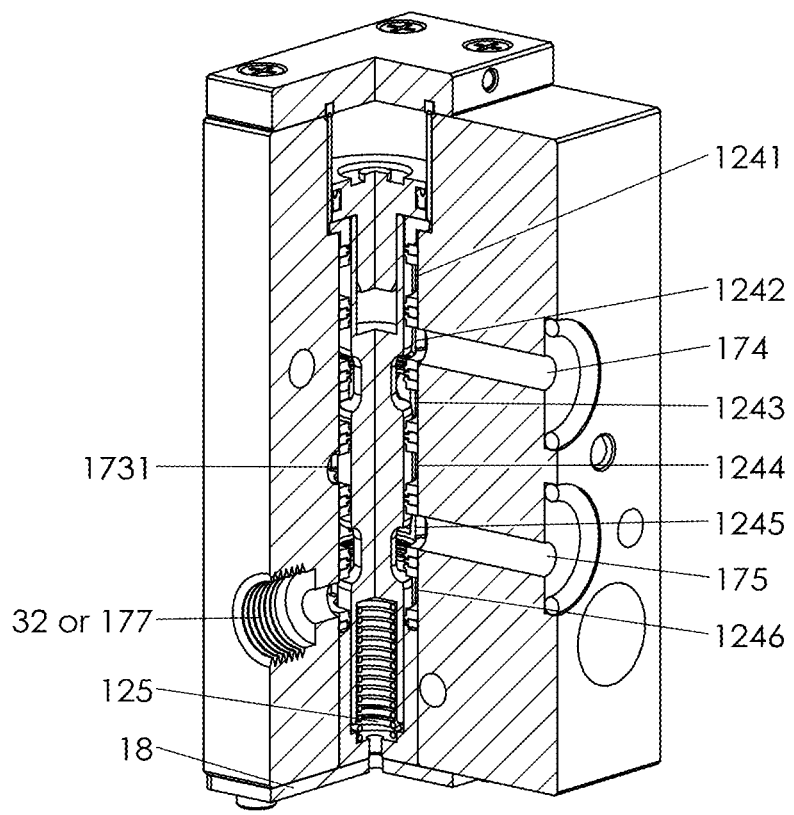
【Figure 28】

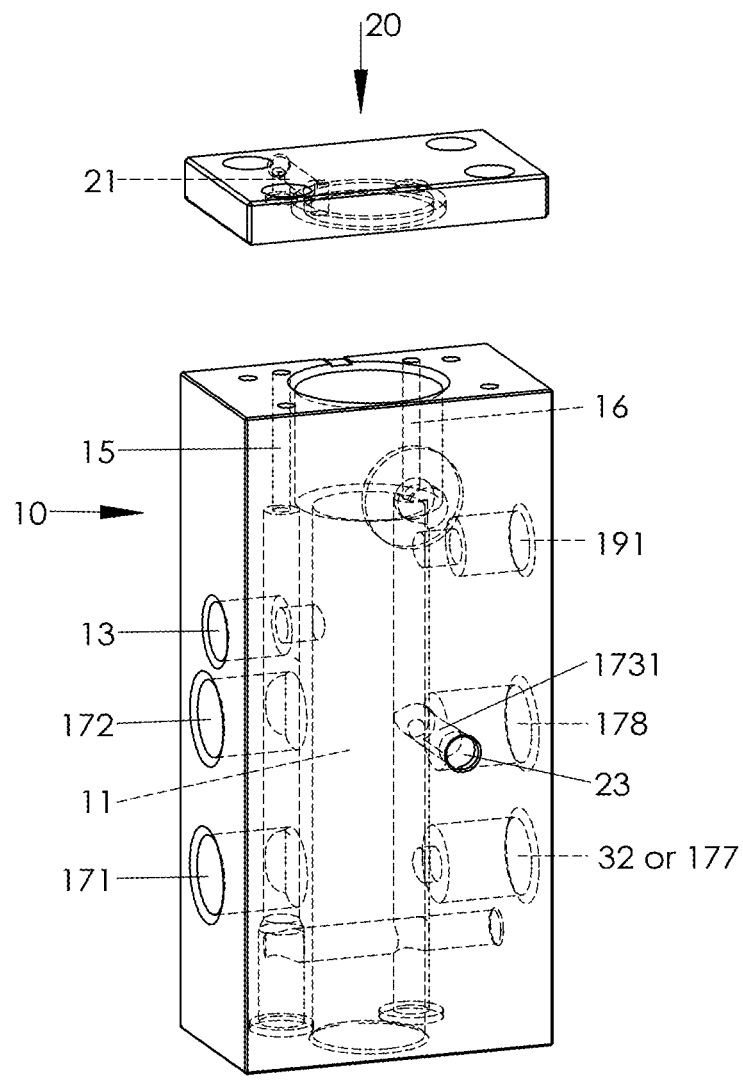
【Figure 29】

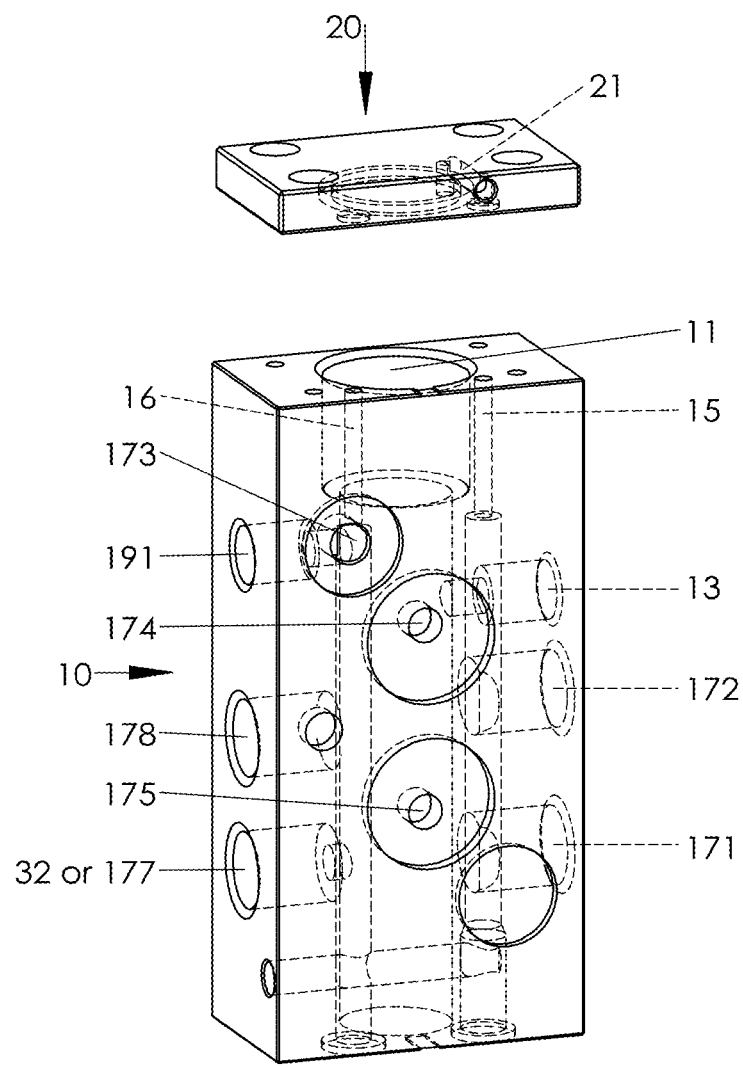
【Figure 30】

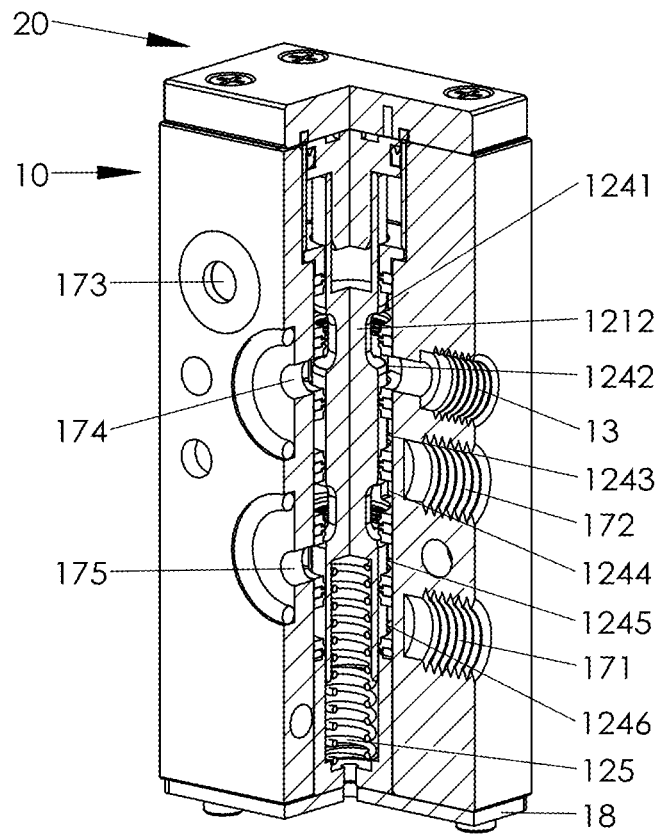
[Figure 31]

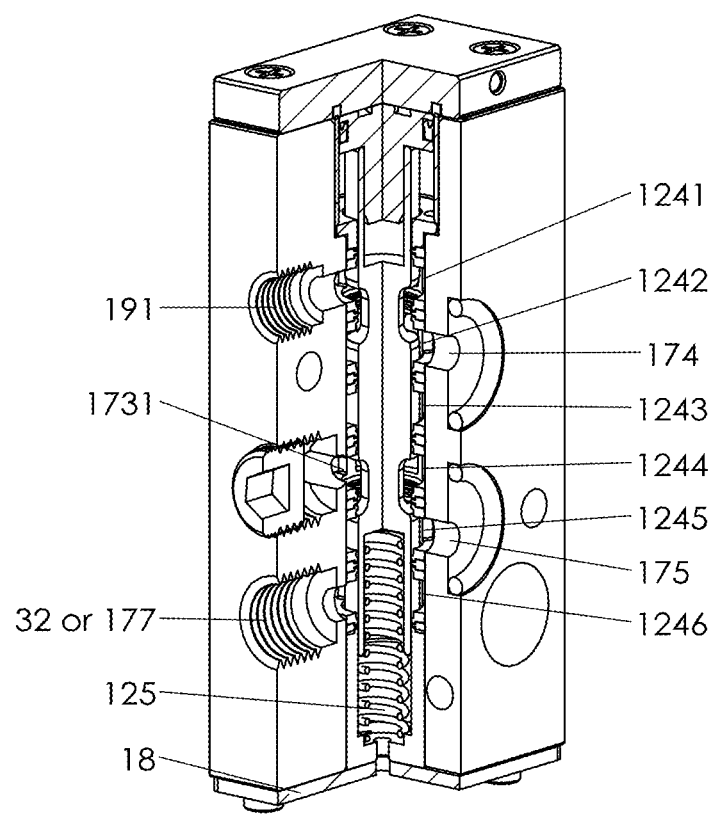
[Figure 32]

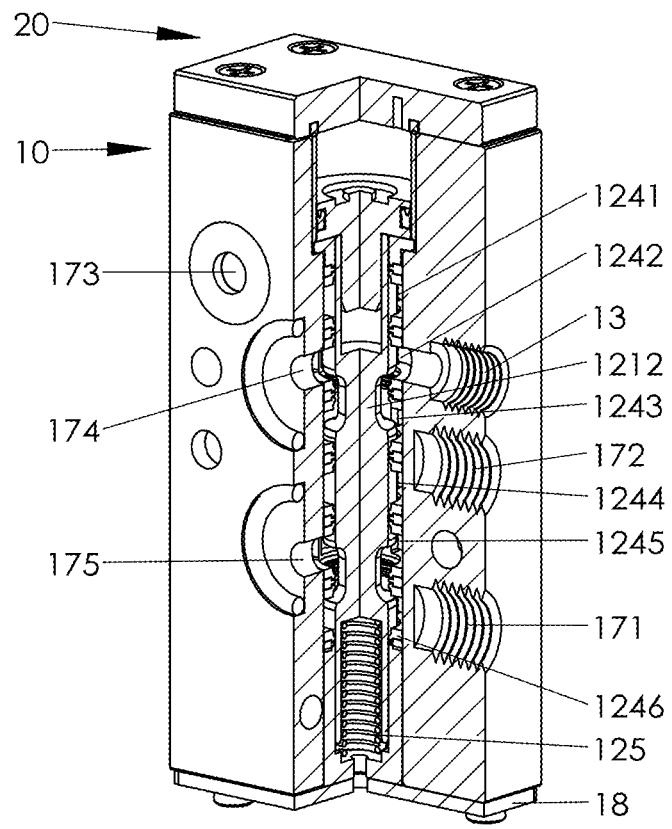
[Figure 33]

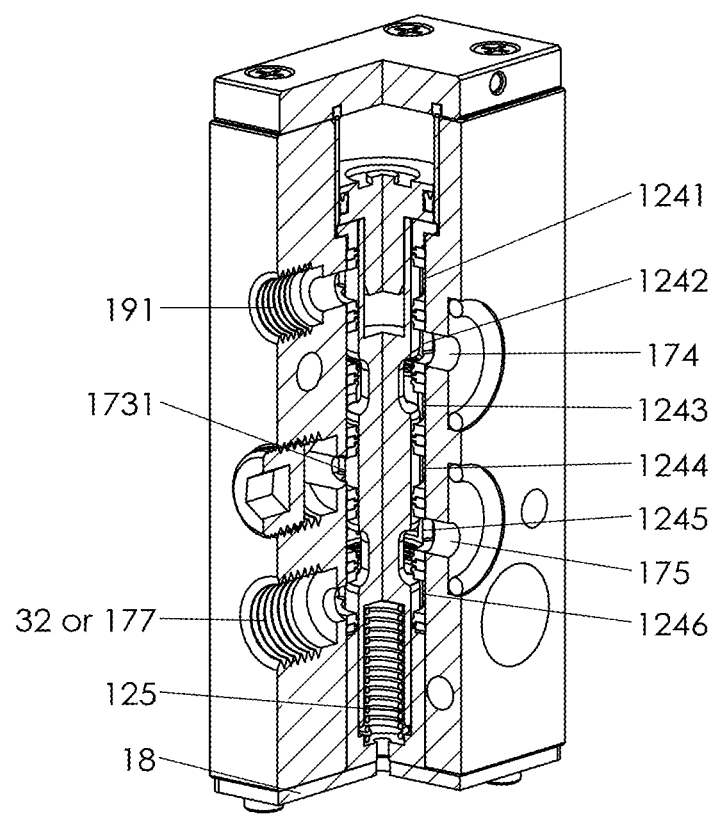
[Figure 34]

PNEUMATIC TRIP VALVE

CROSS REFERENCE TO RELATED APPLICATION

The present application claims priority U.S. Provisional Patent Application No. 62/890,331, entitled "Modified Pneumatic Valve," filed on Aug. 22, 2019. The content of the aforementioned application is incorporated herein by reference in its entirety.

FIELD OF THE DISCLOSURE

The present disclosure relates to a pneumatic valve device, specifically a pneumatic trip valve device that is communication and/or operatively engaged with single-acting or double-acting actuators. The pneumatic trip valve may be used with a valve positioner to make use of an air reservoir to achieve a more accurate opening angle of the actuator, higher torque output, and to fail-safe the actuator to a preset fail-safe position.

BACKGROUND

Control valves (e.g., rotary valve, linear valve, etc.) are used to control the flow of process fluids. Control valves have a flow control member (e.g., ball, disc, plug, etc.) to regulate the amount of fluid flow through the valve. Control valves typically include a pneumatic actuator and positioner to automate the operation of the control valve. The operation of the pneumatic actuator may be controlled by a positioner that supplies air pressure to each side of the pneumatic actuator piston relative to input signals, which in turn provide the force to throttle the flow control member between full open and full close positions.

Typically, control valves are implemented with fail-safe systems. During emergencies, when there is a disruption or loss of air supply, the actuator causes the control valve to move to either a fully closed or fully open position. Known pneumatic actuator fail-safe systems include mechanical spring-return systems or air-based fail-safe systems.

Air-based fail-safe systems are typically implemented with double-acting actuators paired with an air reservoir. When there is a distribution or loss of air supply in a typical installation, a trip valve would override the fluid communication between the positioner and actuator and provide fluid communication between a first actuator piston chamber and the air reservoir. The trip valve also facilitates fluid communication between a second actuator piston chamber and the atmosphere, thus causing the actuator to move towards the second actuator piston chamber. This may set the valve controlled by the actuator in a fully closed or fully open fail-safe position.

However, unlike mechanical spring-return fail-safe systems that are manufactured as an integral package with the actuator, air-based fail-safe systems are often configured ad hoc and involve a complex layout and piping to integrate the necessary and typically separate components such as trip valves, switching valves, check valves, air reservoirs, various fittings, and additional piping to integrate the components. These systems therefore significantly increase the size, complexity, and costs of many pneumatic actuator fail-safe systems.

SUMMARY OF THE DISCLOSURE

The present disclosure generally relates to an improved pneumatic valve having a plurality of ports. In one aspect, the pneumatic valve includes ports A-F, and additional Port 1 and 2. Port A, Port B, Port C, Port D, Port E, Port F, Port 1, and Port 2 are provided on the side of the valve structure. Port B and Port E couples to actuator air supply port. Port F couples to actuator air reservoir port. Port A and Port D receive air supply from positioner. Port C vents to atmosphere.

The disclosed valve structure defines a spool chamber, first internal air path and a second internal air path. In one aspect, the spool chamber and internal air paths may be disposed along an axis of the valve structure. In another aspect, the first internal air path and the second internal air path are collinear. Alternatively, the spool and internal air paths may be configured in other linear or non-linear orientations. The first internal air path provides fluid communication between Port 1 and an optional Port 2. Port 1 connects to the main air supply and Port 2 connects to positioner supply port. The second internal air path provides fluid communication to Port F. In one aspect, an internal check valve is set between first internal air path and second internal air path, to allow fluid communication between first internal air path and second internal air path only in the event that air pressure in first internal air path is larger than air pressure in second internal air path.

Spool system is installed within the spool chamber and loaded against a spring. Valve structure is provided with a switch plate on one side, the switch plate contains a switch plate air path to allow for fluid communication between spool chamber and Port 1.

In one example, when spring in spool system is in compressed first state, Port A is in fluid communication with Port B, Port B is blocked from Port C, Port D is in fluid communication with Port E, Port E is blocked from Port F. When the spring in spool system is in de-compressed second state Port A, Port B, and Port C are in fluid communication, Port D is blocked from Port E, and Port E is in fluid communication with Port F.

In another example, when spring in spool system is in compressed first state, Port A is in fluid communication with Port B, Port B is blocked from Port C, Port D is in fluid communication with Port E, Port E is blocked from Port F. When the spring in spool system is in de-compressed second state Port A is blocked from Port B, Port B is in fluid communication with Port C, Port D is blocked from Port E, and Port E is in fluid communication with Port F.

In another example, when spring in spool system is in compressed first state, Port A is in fluid communication with Port B, Port B is blocked from Port C, Port D is in fluid communication with Port E, Port E is blocked from Port F. When spring in spool system is in de-compressed second state Port A, Port B, and Port C are in fluid communication, Port D, Port E, Port E are in fluid communication.

In another example, when spring in spool system is in compressed first state, Port A is in fluid communication with Port B, Port B is blocked from Port C, Port D is in fluid communication with Port E, Port E is blocked from Port F. When spring in spool system is in de-compressed second state Port A is blocked from Port B, Port B and Port C are in fluid communication, Port D, Port E, Port F are in fluid communication.

The above and other objects, features and advantages of the disclosed subject matter will become apparent from the following detailed description taken with the accompanying drawings.

BRIEF DESCRIPTION OF THE DRAWINGS

FIG. 1 is perspective view of the pneumatic trip valve according to one aspect.

FIG. 2 is an exploded schematic diagram of the pneumatic trip valve of FIG. 1 according to one aspect.

FIG. 3 is an exploded rear view of components and their internal pathways of the pneumatic trip valve of FIG. 1 according to one aspect.

FIG. 4 is an exploded front view of components and their internal pathways of the pneumatic trip valve of FIG. 1 according to one aspect.

FIG. 5 is a perspective view of the pneumatic trip valve in typical set-up with an actuator, an air supply source and a positioner according to one aspect.

FIG. 6 is a three-dimensional perspective view of an example actuator.

FIG. 7 is perspective view of the pneumatic trip valve according to another aspect.

FIG. 8 is a perspective view of the pneumatic trip valve in typical set-up with an actuator, an air supply source, a separate air reservoir, and a positioner according to one aspect.

FIG. 9 is partial sectional view of the of the pneumatic trip valve of FIG. 1 in failsafe due to a loss of sufficient air supply, as viewed along line 7-7 according to one aspect.

FIG. 10 is a schematic diagram of the pneumatic trip valve in failsafe due to a loss of sufficient air supply, the pneumatic trip valve in communication with an actuator of FIG. 6 shown in cross-sectional view along line 6-6 according to one aspect.

FIG. 11 is partial sectional view of the of the pneumatic trip valve of FIG. 1 in normal operation, as viewed along line 7-7 according to one aspect.

FIG. 12 is a schematic diagram of the pneumatic trip valve in normal operation, the pneumatic trip valve in communication with an actuator of FIG. 6 shown in cross-sectional view along line 6-6 according to one aspect.

FIG. 13 is perspective view of the pneumatic trip valve according to one aspect.

FIG. 14 is a front perspective view of the pneumatic trip valve of FIG. 13 showing internal component path according to one aspect.

FIG. 15 is a rear perspective view of the pneumatic trip valve of FIG. 13 showing internal component path according to one aspect.

FIG. 16 is partial sectional view of the of the pneumatic trip valve of FIGS. 13-15 in failsafe due to a loss of sufficient air supply, as viewed along line 8-8 according to one aspect.

FIG. 17 is partial sectional view of the of the pneumatic trip valve of FIGS. 13-15 in failsafe due to a loss of sufficient air supply, as viewed along line 9-9 according to one aspect.

FIG. 18 is a schematic diagram of the pneumatic trip valve of FIGS. 13-15 and 29-30 in failsafe due to a loss of sufficient air supply, the pneumatic trip valve in communication with an actuator of FIG. 6 shown in cross-sectional view along line 6-6 according to one aspect.

FIG. 19 is partial sectional view of the of the pneumatic trip valve of FIGS. 13-15 in normal operation, as viewed along line 8-8 according to one aspect.

FIG. 20 is partial sectional view of the of the pneumatic trip valve of FIGS. 13-15 in normal operation, as viewed along line 9-9 according to one aspect.

FIG. 21 is a schematic diagram of the pneumatic trip valve in normal operation, the pneumatic trip valve in communication with an actuator of FIG. 6 shown in cross-sectional view along line 6-6 according to one aspect.

FIG. 22 is a front perspective view of the pneumatic trip valve similar to the of FIG. 13 showing internal component path according to one aspect where the external three-way valve port is omitted.

FIG. 23 is a rear perspective view of the pneumatic trip valve similar to the of FIG. 13 showing internal component path according to one aspect where the external three-way valve port is omitted.

FIG. 24 is partial sectional view of the of the pneumatic trip valve of FIGS. 22-23 in failsafe due to a loss of sufficient air supply, as viewed along line 8-8, as shown in FIG. 13, according to one aspect.

FIG. 25 is partial sectional view of the of the pneumatic trip valve of FIGS. 22-23 in failsafe due to a loss of sufficient air supply, as viewed along line 9-9, as shown in FIG. 13, according to one aspect.

FIG. 26 is a schematic diagram of the pneumatic trip valve of FIGS. 22-23 in failsafe due to a loss of sufficient air supply, the pneumatic trip valve in communication with an actuator of FIG. 6 shown in cross-sectional view along line 6-6 according to one aspect.

FIG. 27 is partial sectional view of the of the pneumatic trip valve of FIGS. 22-23 in normal operation, as viewed along line 8-8, as shown in FIG. 13, according to one aspect.

FIG. 28 is partial sectional view of the of the pneumatic trip valve of FIGS. 22-23 in normal operation, as viewed along line 9-9, as shown in FIG. 13, according to one aspect.

FIG. 29 is a front perspective view of the pneumatic trip valve similar to the of FIG. 13 showing internal component path according to one aspect where the Port A is formed in a side of the valve structure according to one aspect.

FIG. 30 is a rear perspective view of the pneumatic trip valve similar to the of FIG. 13 showing internal component path according to one aspect where the Port A is formed in a side of the valve structure according to one aspect.

FIG. 31 is partial sectional view of the of the pneumatic trip valve of FIGS. 29-30 in failsafe due to a loss of sufficient air supply, as viewed along line 8-8, as shown in FIG. 13, according to one aspect.

FIG. 32 is partial sectional view of the of the pneumatic trip valve of FIGS. 29-30 in failsafe due to a loss of sufficient air supply, as viewed along line 8-8, as shown in FIG. 13, according to one aspect.

FIG. 33 is partial sectional view of the of the pneumatic trip valve of FIGS. 29-30 in normal operation, as viewed along line 8-8, as shown in FIG. 13, according to one aspect.

FIG. 34 is partial sectional view of the of the pneumatic trip valve of FIGS. 29-30 in normal operation, as viewed along line 9-9, as shown in FIG. 13, according to one aspect.

DETAILED DESCRIPTION OF THE DISCLOSURE

Figure 35:
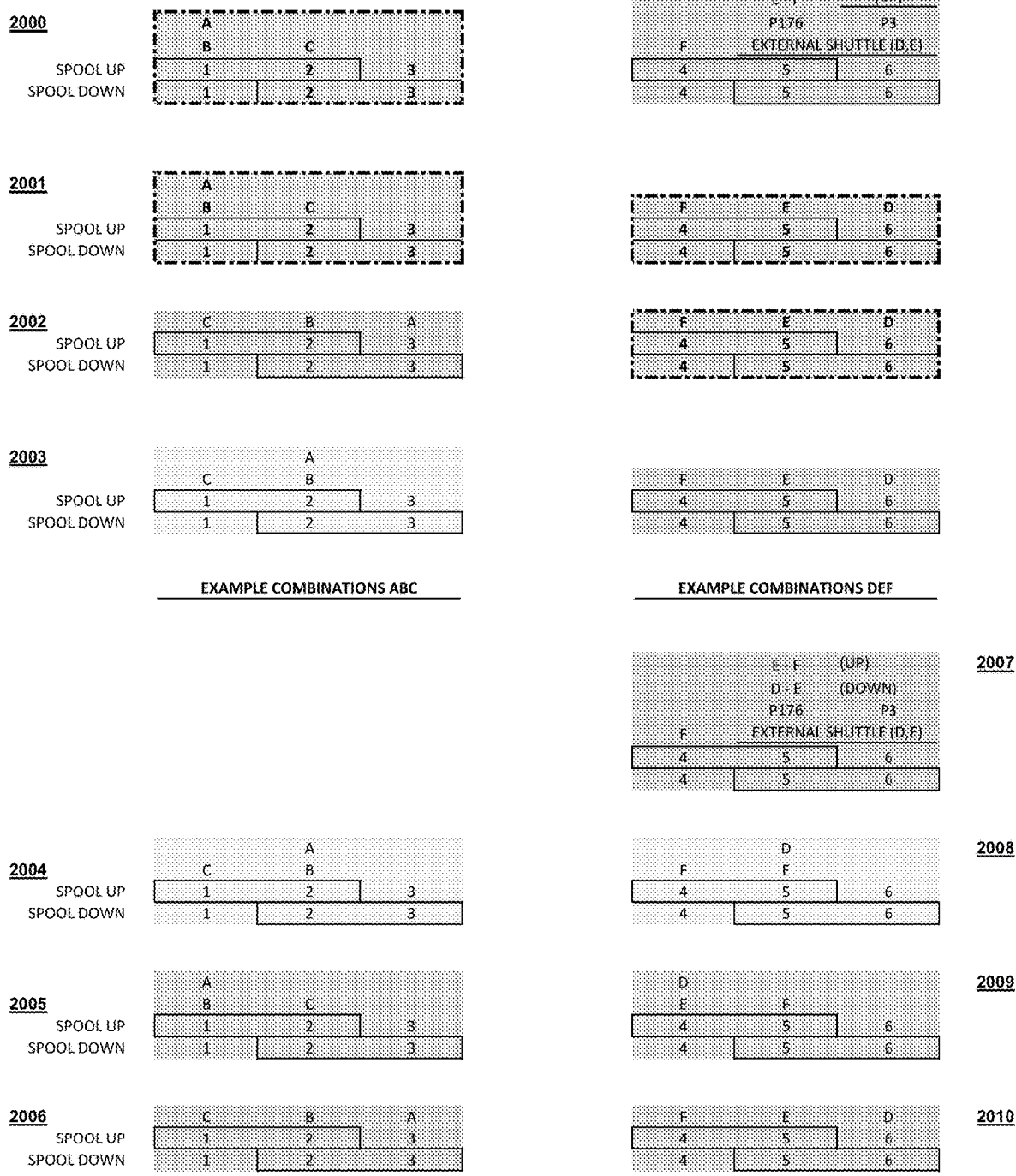
FIG. 35 is a chart illustrating combinations of port connections and communications that may facilitated by various aspects of the pneumatic trip valve.

The present disclosure generally relates to a pneumatic trip valve having a plurality of ports that may be used with an actuator alone or in conjunction with a positioner to place a control valve in a fail-safe configuration in response to a loss of air supply or when air pressure supplied to the trip valve 1, fails below a minimum threshold. In various aspects, the minimum threshold for the air supply is in a range between 0-150 psi. The minimum threshold may be selected or altered by a user of the disclosed device and systems. In various aspects, the pneumatic trip valve may include an external three-way valve.

Various aspects of an improved pneumatic valve 1 are shown in FIGS. 1, 7, 13, 22-23, and 29-30. In one aspect, the pneumatic trip valve 1 includes a valve structure 10, a bottom plate 18, and a switch plate 20, and an external three-way valve 30. As shown, the valve structure 10 may be connected to the switch plate 20 and the external three-way valve 30.

As shown in FIGS. 2 to 4, the valve structure 10 defines a spool chamber 11, and includes a Port A 13 in the top portion of the valve structure and a Port E connection 14 for a in the bottom portion of the valve structure. In various aspects, Port A and Port E are axially aligned, while in other aspects, Port A and Port E are not axially aligned. The spool chamber 11 receives spool assembly 12, the spool assembly 12 includes a spool 121 and a spool sleeve 122, and a spring 125 disposed at the bottom portion of the spool assembly. The valve structure 10 also defines first internal air path 15 and a second internal air path 16. The valve structure 10 also includes an internal check valve 151 that permits one-way flow between the first internal air path 15 and the second internal air path 16 when air pressure in first internal air path 15 is greater than second internal air path 16. In various aspects, the check valve 151 may be disposed in the first internal air path 15, the second internal air path 16, or disposed between the first internal air path and the second internal air path.

In one aspect, the sides of the valve structure 10 include a plurality of additional ports including a Port 1 171, a Port 2 172, a Port F 173, a Port B 174, a Port E 175, an external three-way valve port 176, Port 3 177 and a Port C 191. In one aspect, Port A 13 is fluidly connected to Port B 174 and Port E connection 14 is fluidly connected to Port E 175. The first internal air path 15 fluidly connects Port 1 171 and, may connect to an optional Port 2 172. The second internal air path 16 is in fluid communication with Port F 173, an external air reservoir port 178, and a first spool inlet 1731. The first spool inlet 1731 is connected to the spool chamber 11 and the same time the spool chamber 11 is connected to valve structure external three-way valve Port 176, Port 3 177, Port C 191, and second spool inlet 19. The second spool inlet 19 fluidly connects Port A 13 and the spool chamber 11. The end of the second spool inlet 19 is provided with a sealing mechanism 22, such as a steel ball as shown in FIGS. 11 and 19, to prevent air from flowing out through the valve structure 10. In various aspects, it is desirable to place the internal check valve 151 in the internal air path formed by the first internal air path 15 and the second internal air path 16, upstream or prior to any of: the first spool inlet 1731, Port F 173 or the external air reservoir port 178 intersecting the second internal air path 16. Alternatively, it is desirable to place the internal check valve 151 in the internal air path formed by the first internal air path 15 and the second internal air path 16 downstream or after Port 1 171. Although described with the optional Port 2 present, in various aspects, the trip valve 1 omits Port 2. In these aspects, the trip valve 1 is not in fluid communication with a positioner supply port. Instead, T-fitting is installed between Port 1 171 and the main air supply 60, with the remaining port on the T-fitting in fluid communication to the positioner supply port.

The spool 121 is recessed to form a plurality of spool indent 1211, and a first spacing 1214 is formed between each of the spool indent 1211. The spool sleeve 122 is engaged to the top of the spool 121. The spool 121 further includes a plurality of lip seals 123 that include but are not limited to O-rings or other resilient structures. The spool 121 also includes spacers 124 that are separated by a second spacing b 1215. The spool indent 1211 includes a first spool indent 1212 and a second spool indent 1213. As shown, the spacers 124 include a first spacer 1241, a second spacer 1242, a third spacer 1243, a fourth spacer 1244, a fifth spacer 1245, and a sixth spacer 1246. As used herein the spacers 124, including spacers 1241-1246, define openings in the spool 121 that permit fluid communication through a portion of the spool.

In operation, the first spool indent 1212 may be translated between the first spacer 1241, the second spacer 1242, and the third spacer 1243, allowing for a first state fluid communication between first spacer 1241 with the second spacer 1242, or a second state fluid communication between second spacer 1242 with the third spacer 1243. Similarly, the second spool indent 1213 is shifted between the fourth spacer 1244, the fifth spacer 1245, and the sixth spacer 1246, allowing for first state fluid communication between fourth spacer 1244 with the fifth spacer 1245, or second state fluid communication between fifth spacer 1245 with the sixth spacer 1246.

In various aspects, the valve structure 10 includes an external air reservoir port 178 on the side. The external air reservoir port 178 may be plugged when not in use. The external air reservoir port 178 is fluidly connected to the second internal air path 16. The external air reservoir port 178 can be connected to an external air reservoir 1781, as shown in FIGS. 8 and 10.

As shown in FIGS. 3 and 4, a switch plate air path 21 is defined within the switch plate 20. The ends of the switch plate air path 21 allow for fluid communication between first internal air path 15 and the spool chamber 11.

The external three-way valve 30 has a three-way channel 31 inside, and the ends of the three-way channel 31 are respectively provided with a Port D 32, an external three-way valve first port 33, and an external three-way valve second port 34. A first piping 41 includes connecting external three-way valve first port 33 with Port E connection 14. A second piping 42 is a means of connecting external three-way valve second port 34 with valve structure external three-way valve Port 176. In addition, as seen in FIGS. 14 and 22, the first spool inlet 1731 may be blocked by sealing mechanism 23, so that the air cannot escape from valve structure 10. In other aspects, the external three-way valve 30 is omitted and each of the Ports A-F, are ported directly or indirectly to the spool chamber 11.

As shown in FIG. 5, one example deployment if pneumatic trip valve 1 combines an actuator 50, a main air supply source 60 and a positioner 70. In this example, an external three-way valve 30 is combined with the valve structure 10 through the first piping 41 and the second piping 42. In one aspect, the actuator 50 may include an actuator IB port 51, an actuator IC port 52 and an actuator ID port 53. Port F 173 is fluidly connected to actuator IB port 51, Port B 174 is fluidly connected to actuator IC port 52, and Port E 175 is fluidly connected to actuator ID port 53. In other aspects, many actuators do not include the actuator IB port 51. In this aspect, Port F 173 may be blocked by a plug 1782, and the external air reservoir 1781 may be piped to the air reservoir port 178. As such, the pneumatic trip valve 1 is suitable for use with a wide variety of actuators, including but limited to rotary actuators, linear actuators, actuators having two or more piston chambers, actuators with on-board air reservoirs, and actuators without on-board air reservoir. Likewise, the pneumatic trip valve 1 is suitable for use with a wide variety of positioners. Additionally, the pneumatic trip valve 1 may be incorporated in to systems having one or more existing trip valves.

Referring now to FIGS. 5, 6, 10, 12, 18, 21, and 26, one example of an actuator 50 for operating a control valve is shown. The actuator 50 have one or more actuator pistons 54, an actuator lever arm 55, a first actuator piston chamber 501, a second actuator piston chamber 502 and, optionally an actuator air reservoir 503. As previously noted, the pneumatic trip valve 1 may be used with single acting or double acting actuators, including actuators that lack an on-board air reservoir.

In the example shown, the supply of air to the first actuator piston chamber 501 causes the actuator piston 54 to move away from an initial set point, while air supply to the second actuator piston chamber 502 causes the actuator piston 54 to move towards the initial set point. In one example, the actuator piston 54 may be in communication with the actuator lever arm 55 that is further in operable communication with the control valve. In many actuators, the air reservoir 503, the first actuator piston chamber 501, and the second actuator piston chamber 502 are independent of one another. As shown, the actuator air reservoir 503 is fluidly connected to the actuator IB port 51, the first actuator piston chamber 501 is fluidly connected to the actuator IC port 52, and the second actuator piston chamber 502 is fluidly connected to the actuator ID port 53.

The pneumatic trip valve 1 may assume a variety of operational configurations to achieve a desired fail-safe condition for an associated control valve. These operational configurations may be implemented when a fluid flow control system employing the pneumatic trip valve 1 experiences a loss of air supply to the pneumatic trip valve from the main air supply or from a main air supply routed through one or more of the actuator or positioner.

Example 1: Loss of Air Supply: A-B-C, D×E-F & Return of Air Supply A-B×C, D-E×F

Referring now to FIGS. 1-5 and 7-12, the pneumatic trip valve 1 takes on this operational configuration, when there is not enough air pressure supplied to the spool chamber 11 from the main air supply source 60 via the switch plate air path 21 to overcome the spring 125, as shown in FIGS. 2, 9, and 10. As a result, the spring 125 forces the spool 121 upwards, positioning the first spool indent 1212 to allow fluid communication between the first spacer 1241 and the second spacer 1242. Likewise, the second spool indent 1213 is positioned to allow fluid communication between the fourth spacer 1244 and the fifth spacer 1245. Port A 13 of the valve 1 is in fluid communication with the positioner 70 first out port 71 and Port B 174 is in fluid communication with actuator IC port 52. Port C 191 is in fluid communication with atmosphere and Port D 32 is in fluid communication with positioner 70 second out Port 72. Port E 175 is in fluid communication with actuator ID port 53, Port F 173 is in fluid communication with actuator IB port 51, and Port 3 177 is in fluid communication with atmosphere.

In this example, Port A 13 and Port B 174 are both in fluid communication with first spacer 1241, while Port C 191 is in fluid communication with second spacer 1242. This results in the first actuator piston chamber 501 venting to atmosphere through the actuator IC port 52 that is in fluid communication with Port B 174 and Port C 191.

Additionally, Port F 173 and first spool inlet 1731 are in fluid communication with fourth spacer 1244, valve structure external three-way valve port 176 is in fluid communication with the fifth spacer 1245, and Port 3 177 is in fluid communication with the sixth spacer 1246. The actuator air reservoir 503 is in fluid communication with the actuator IB port 51, Port F 173 and the first spool inlet 1731. By this configuration, the first spool inlet 1731 has higher air pressure than Port D 32 causing shuttle valve in external three-way valve 30 to move towards Port D 32, thus providing fluid communication between Port E 175 and Port F 173. As a result, the stored air in actuator air reservoir 503 is in fluid communication with the second actuator piston chamber 502, causing the actuator piston 54 to move to the set point, as shown in FIG. 10.

Referring now to FIGS. 2, 11, and 12, when there is sufficient pressure from the main air supply source 60 via the switch plate air path 21 to overcome the spring 125, and move the spool 121 downwards. This translation of the spool 121 results in the first spool indent 1212 permitting fluid communication between second spacer 1242 and the third spacer 1243, and the second spool indent 1213 allowing fluid communication between the fifth spacer 1245 and the sixth spacer 1246.

Additionally, Port A 13 and Port B 174 are both in fluid communication with the first spacer 1241, while Port C 191 is in fluid communication with the second spacer 1242. This allows the first actuator piston chamber 501 to receive air through the actuator IC port 52 that is in fluid communication with Port B 174 and Port A 13.

In this configuration, Port F 173 and the first spool inlet 1731 are in fluid communication with the fourth spacer 1244, the external three-way valve port 176 is in fluid communication with the fifth spacer 1245, and Port 3 177 is in fluid communication with sixth spacer. The internal check valve 151 allows the actuator air reservoir 503 to be charged through Port 1 171 when air pressure of Port 1 171 is greater than the pressure within the actuator air reservoir 503. The fourth spacer 1244 is in fluid communication with first spool inlet 1731 and ultimately, Port F 173, thus the first spool inlet 1731 holds the actuator air reservoir 503 independent. Port D 32 has higher air pressure than Port 3 177 causing the shuttle valve in external three-way valve 30 to move towards the external three-way valve port two 34, thereby creating fluid communication between Port D 32, Port E 175, and the second actuator piston chamber 502.

Example 2: Loss of Air Supply: A-B-C, D×E-F & Return of Air Supply A-B×C, D-E×F

With reference to FIGS. 13-17, 19, and 20, another aspect of the pneumatic trip valve 1 that does not include the external three-way valve 30. As shown in FIGS. 14-17, 19, and 20, the valve structure external three-way valve Port 176 and the Port E connection 14 are plugged. The valve 1 includes a through hole from Port E 175 to the fifth spacer 1245. In this aspect, the Port 3 177 functions the same as Port D 32 of the external three-way valve 30.

The pneumatic trip valve 1 takes on this operational configuration, as shown in FIGS. 16-18, when there is not enough air pressure supplied to the spool chamber 11 from the main air supply source 60 via the switch plate air path to overcome the spring 125. As a result, the spring 125 pushes the spool 121 upwards, positioning the first spool indent 1212 to allow fluid communication between the first spacer 1241 and the second spacer 1242 and positioning the second spool indent 1213 to allow fluid communication between the fourth spacer 1244 and the fifth spacer 1245.

As shown, Port A 13 is in fluid communication with the positioner 70 first out port 71 and Port B 174 is in fluid communication with actuator IC port 52. Port C 191 is in fluid communication with atmosphere, and Port D 32 (instead of the omitted 3-way valve Port 3 177) is in fluid communication with positioner 70 second out port 72. Port E 175 is in fluid communication with the actuator ID port 53 and Port F 173 is in fluid communication with the actuator IB port 51. Port A 13 and Port B 174 are both in fluid communication with the first spacer 1241; while Port C 191 is in fluid communication with the second spacer 1242 resulting in first actuator piston chamber 501 venting to atmosphere through actuator IC port 52 that is in fluid communication with Port B 174 and Port C 191.

In this example, Port D 32 is in fluid communication with the sixth spacer 1246, Port E 175 is in fluid communication with the fifth spacer 1245, and Port F 173 and the first spool inlet 1731 are in fluid communication with the fourth spacer 1244. This arrangement resulting in the actuator air reservoir 503 being in fluid communication with actuator IB port 51, Port F 173, first spool inlet 1731, Port E 175, actuator ID port 53, and second actuator piston chamber 502. As such, an air supply from the actuator air reservoir 503 acts on the second actuator piston chamber 502 causing the actuator piston 54 to move to the set point, as illustrated in FIG. 18.

With reference to FIGS. 19-21, when there is sufficient pressure from the main air supply source 60 to the switch plate air path 21 to overcome the upward bias of the spring 125, the spool 121 is translated downwards. As a result, the first spool indent 1212 is positioned to allow fluid communication between the second spacer 1242 and the third spacer 1243. Likewise, the second spool indent 1213 is positioned to allow fluid communication between the fifth spacer 1245 and the sixth spacer 1246.

In this example, Port A 13 and Port B 174 are both in fluid communication with the first spacer 1241, while Port C 191 is in fluid communication with second spacer 1242. This results in the first actuator piston chamber 501 receiving air through actuator IC port 52 which is in further fluid communication with Port B 174 and Port A 13.

In this example, Port D 32 (instead of the omitted 3-way valve Port 3 177) is in fluid communication with sixth spacer 1246, Port E 175 is in fluid communication with the fifth spacer 1245. Simultaneously, Port F 173 and the first spool inlet 1731 are in fluid communication with the fourth spacer 1244 resulting in the second actuator piston chamber 502 being in fluid communication with actuator ID port 53, Port E 175, and Port D 32. The internal check valve 151 allows the actuator air reservoir 503 to be charged through Port 1 171, when the air pressure of port one 171 is greater than that of the actuator air reservoir 503. As a result, the fourth spacer 1244 that is in fluid communication with Port F 173 holds the actuator air reservoir 503 independent.

Example 3: Loss of Air: A×B-C, D×E-F—Return of Air: A-B×C, D-E×F

Referring now to FIGS. 22-25, 27, and 28 that illustrate another aspect of the pneumatic trip valve 1 that does not include the external three-way valve 30. In this aspect, the external three-way valve Port 176, and Port E connection 14 can be removed or plugged. Port D 32 is synonymous with Port 3 177 and is provided on the side of the valve structure 10 with through hole to sixth spacer 1246. Port E 175 is provided with through hole to fifth spacer 1245. Port A 13 is provided on the side of the valve structure 10 with through hole to third spacer 1243. Port B 174 is provided with through hole to second spacer 1242. Port C 191 is provided with through hole to first spacer 1241.

When there is not enough pressure from the main air supply source 60 via the switch plate air path 21 to overcome the force of the spring 125, the spool 121 is biased upwards, as shown in FIGS. 24-26. This results in the first spool indent 1212 being positioned to allow fluid communication between first spacer 1241 and the second spacer 1242 and results in the second spool indent 1213 being positioned to allow fluid communication between the fourth spacer 1244 and the fifth spacer 1245. In this configuration, Port A 13 is in fluid communication with positioner 70 first out port 71, Port B 174 is in fluid communication with actuator IC port 52, and Port C 191 is in fluid communication with atmosphere. Port D 32 is in fluid communication with positioner 70 second out port 72, Port E 175 is in fluid communication with actuator ID port 53, and Port F 173 is in fluid communication with actuator IB port 51.

In this example, Port A 13 is also in fluid communication with third spacer 1243, Port B 174 is also in fluid communication with second spacer 1242, and Port C 191 is also in fluid communication with first spacer 1241. As such, the first actuator piston chamber 501 is vented to atmosphere through actuator IC port 52 that is also in fluid communication with Port B 174 and Port C 191.

Additionally, Port D 32 is in fluid communication with the sixth spacer 1246, Port E 175 is in fluid communication with the fifth spacer 1245, while Port F 173 and the first spool inlet 1731 are in fluid communication with fourth spacer 1244. This brings the actuator air reservoir 503 in fluid communication with the actuator IB port 51, Port F 173, first spool inlet 1731, Port E 175, actuator ID port 53, and second actuator piston chamber 502. In this aspect, the air supply from the actuator air reservoir 503 received in the second actuator piston chamber 502 causes the actuator piston 54 to move to a fail-safe set point.

Referring to FIGS. 21, 27, and 28 in conjunction with FIG. 2. When there is sufficient pressure from the main air supply source 60 via the switch plate air path 21 to overcome the force of the spring 125, the spool 121 moves downwards. This results in the first spool indent 1212 being positioned to allow fluid communication between the second spacer 1242 and the third spacer 1243 and results in the second spool indent 1213 being positioned to allow fluid communication between the fifth spacer 1245 and the sixth spacer 1246.

In this example, Port A 13 is also in fluid communication with the third spacer 1243, Port B 174 is also in fluid communication with second spacer 1242, and Port C 191 is also in fluid communication with first spacer 1241. As a result, the first actuator piston chamber 501 is in fluid communication with the actuator IC port 52, Port B 174, and Port A 13.

Additionally, Port D 32 is also in fluid communication with the sixth spacer 1246, Port E 175 is also in fluid communication with fifth spacer 1245, while Port F 173 and first spool inlet 1731 are also in fluid communication with fourth spacer 1244. This arrangement brings the second actuator piston chamber 502 in fluid communication with the actuator ID port 53, Port E 175, and Port D 175. The internal check valve 151 allows the actuator air reservoir 503 to be charged through Port 1 171 when the air pressure of Port 1 171 is greater than the actuator air reservoir 503. The fourth spacer 1244 that is in fluid communication with Port F 173 holds the actuator air reservoir 503 independent.

Example 4: Loss of Air: A-B-C, D×E-F—Return of Air: A-BC, D-E×F

Referring now to FIGS. 2, 18, and 29-34. As shown in FIGS. 18, 31, 32, and FIG. 2, when there is not enough pressure from the main air supply source 60 via the switch plate air path 21 to overcome the force of the spring 125, the spool 121 is biased upwards. As such, the first spool indent 1212 is positioned to allow fluid communication between the first spacer 1241 and the second spacer 1242 and the second spool indent 1213 is positioned to allow fluid communication between the fourth spacer 1244 and the fifth spacer 1245. Port A 13 is in fluid communication with positioner 70 first out port 71, Port B 174 is in fluid communication with actuator IC port 52, and Port C 191 is in fluid communication with atmosphere. Port D is in fluid communication with positioner 70 second out Port 72, Port E is in fluid communication with actuator ID port 53, and Port F is in fluid communication with actuator IB port 51.

In this example the pneumatic trip valve 1 that does not include the external three-way valve 30. As such, the external three-way valve port 176, and Port E connection 14 are not formed in the value structure 1, as shown in FIGS. 29-30 or they may be plugged, as shown in FIGS. 15-16, for example.

Port D 32 is provided on the side of the valve structure 10 with an elongated channel to the sixth spacer 1246. Port E 175 is provided with an elongated channel to the fifth spacer 1245. Port A 13 is provided on the side of the valve structure 10 with an elongated channel to the second spacer 1242. Port B 174 is provided with an elongated channel to second spacer 1242 and Port C 191 is provided with a an elongated channel to first spacer 1241.

In this example, Port A 13 and Port B 174 are in fluid communication with second spacer 1242, while Port C 191 is in fluid communication with first spacer 1241. As such, the first actuator piston chamber 501 is vented to atmosphere through the actuator IC port 52 which is in further fluid communication with Port B 174 and Port C 191.

As shown, Port D 32 is in fluid communication with the sixth spacer 1246, Port E 175 is in fluid communication with fifth spacer 1245, while Port F 173 and first spool inlet 1731 are in fluid communication with fourth spacer 1244. This arrangement brings the actuator air reservoir 503 in fluid communication with the actuator IB port 51, Port F 173, the first spool inlet 1731, Port E 175, the actuator ID port 53, and the second actuator piston chamber 502. As a result, the air supply from the actuator air reservoir 503 is received in the second actuator piston chamber 502 causes the actuator piston 54 to move to the set point.

Referring to FIGS. 2, 21, 33, and 34; when there is sufficient pressure from the main air supply source 60 via the switch plate air path 21 to overcome upward force of the spring 125, the spool 121 is translated downwards. As a result, in the first spool indent 1212 is positioned to allow fluid communication between the second spacer 1242 and the third spacer 1243 and the second spool indent 1213 is positioned to allow fluid communication between the fifth spacer 1245 and the sixth spacer 1246.

In this example, Port A 13 and Port B 174 are also in fluid communication with the second spacer 1242, and Port C 191 is also in fluid communication with first spacer 1241, such that the first actuator piston chamber 501 is in fluid communication with actuator IC port 52, Port B 174, and Port A 13. Additionally, Port D 32 is also in fluid communication with the sixth spacer 1246, Port E 175 is also in fluid communication with fifth spacer 1245, while Port F 173 and the first spool inlet 1731 are also in fluid communication with the fourth spacer 1244. As a result, the second actuator piston chamber 502 is brought into fluid communication with the actuator ID port 53, Port E 175, and Port D 175. The internal check valve 151 allows the actuator air reservoir 503 to be charged through Port 1 171 when the air pressure of port one is greater than that of the actuator air reservoir 503. The fourth spacer 1244 being in fluid communication with Port F 173 holds the actuator air reservoir 503 independent.

Example 5: Loss of Air: F-E-D

In yet another aspect, Port D 32, Port E 175, the first spool inlet 1731, and Port F 173 are defined by the valve structure 10 in a different configuration. In this aspect, Port D 32, Port E 175 may be brought into fluid communication with fifth spacer 1245, while Port F 173 and the first spool inlet 1731 are brought into fluid communication with the fourth spacer 1244. Alternatively, Port D 32, Port E 175 may be brought into fluid communication with the fourth spacer 1244, while Port F 173 and the first spool inlet 1731 are brought into fluid communication with the fifth spacer 1245.

Additional example combinations 2000-2010 of the fluid communications that may be formed between Ports A-F and the internal air paths of the valve structure 10 are shown in FIG. 35. FIG. 35 illustrates example combinations 2000-2003 made by four different configurations of the pneumatic trip valve 1. Examples 2004-2010 illustrate example positioning and connections of the three-way valves individually. As shown in example 2004, with reference to FIG. 2, when the combined Ports A-B may be in fluid communication with the second spacer 1242 and third spacer 1243 when the spring 125 is in compressed configuration because of the main air supply exerting force on the spool to overcome the force of the spring. In this configuration, the trip valve 1 is in a normal operational configuration. Conversely, when Port A is in fluid communication with Port B, the pneumatic trip valve 1 may be configured to bring the combined Ports A-B in fluid communication with Port C through the first and second spacers 1241 and 1242, respectively, in a fail-safe operation. This occurs when the main air supply is insufficient to force the spool downward to overcome the force of the spring 125. As such, the spool is translated upward, bringing combined ports A-B into communication with Port C.

Numerous examples and statements are provided herein to enhance understanding of the present disclosure. A specific set of statements are provided as follows:

Statement 1. A pneumatic trip valve comprising: a valve body further comprising: a first internal air path in communication with a first port; a second internal air path in communication with the first internal air path, wherein the first internal air path and the second internal air path are in fluid communication through a check valve; a first three-way valve; and, a second three-way valve; and, wherein the first three-way valve and the second three-way valve assume an normal operational configuration when an air supply is provided to the first port; and, wherein the first three-way valve and the second three-way valve assume a fail-safe configuration in response to a decrease of the air supply received at the first port below a minimum threshold.

Statement 2. The pneumatic trip valve of statement 1 wherein the first three-way valve comprises a port A, a port B, and a port C, and the second three-way valve comprises a port D, a port E, and a port F.

Statement 3. The pneumatic trip valve of statement 2 wherein the port F is in fluid communication with the second internal air path.

Statement 4. The pneumatic trip valve of statements 1 or 2 further comprising an external reservoir port.

Statement 5. The pneumatic trip valve of statement 1 wherein the normal operational configuration comprises providing fluid communication between the port A and the port B and fluid communication between the port D and the port E.

Statement 6. The pneumatic trip valve of statement 1 wherein the fail-safe configuration comprises providing fluid communication between the port B and the port C.

Statement 7. The pneumatic trip valve of statement 6, wherein the port B is also in fluid communication with the port A.

Statement 8. The pneumatic trip valve of statement 1 wherein the fail-safe configuration comprises providing fluid communication between the port E and the port F.

Statement 9. The pneumatic trip valve of statement 8, wherein the port E is also in fluid communication with the port D.

Statement 10. The pneumatic trip valve of statement 1 wherein the first internal air path is in fluid communication with a main air supply.

Statement 11. The pneumatic trip valve of statement 1 wherein the second internal air path is in fluid communication with a reservoir air supply.

Statement 12. The pneumatic trip valve of statement 11 wherein the reservoir air supply is an onboard air reservoir integrated with the pneumatic trip valve.

Statement 13. The pneumatic trip valve of statement 11 wherein the reservoir air supply is an onboard air reservoir integrated with an actuator or a positioner.

Statement 14. The pneumatic trip valve of statement 13, wherein: Port A is in fluid communication with the positioner; Port B is in fluid communication with the actuator; Port C is exhausted to an atmosphere; Port D is in fluid communication with the positioner; and Port E is in fluid communication with the actuator.

Statement 15. The pneumatic trip valve of statement 14, wherein Port F is sealed with a plug or in fluid communication with an onboard air reservoir.

Statement 16. The pneumatic trip valve of statement 12 wherein the onboard reservoir air supply is in fluid communication with the port F.

Statement 17. The pneumatic trip valve of statement 11 wherein the reservoir air supply is an external stand-alone air reservoir.

Statement 18. The pneumatic trip valve of statement 17 wherein the external stand-alone air reservoir is in fluid communication with an external air reservoir port of pneumatic trip valve.

Statement 19. The pneumatic trip valve of statement 13, wherein the onboard reservoir air supply is in fluid communication with an external air reservoir port of the pneumatic trip valve.

Statement 20. The pneumatic trip valve of statement 17, wherein: Port A is in fluid communication with the positioner; Port B is in fluid communication with the actuator; Port C is exhausted to an atmosphere; Port D is in fluid communication with the positioner; and Port E is in fluid communication with the actuator.

Statement 21. The pneumatic trip valve of statement 17, wherein Port F is sealed with a plug or in fluid communication with an onboard air reservoir.

Statement 22. The pneumatic trip valve of statement 21, wherein the onboard air reservoir is integrated with at least one of a positioner or an actuator.

Statement 23. The pneumatic trip valve of statement 1 wherein the check valve is disposed within the valve body.

Statement 24. The pneumatic trip valve of statement 1 further comprising: a spool chamber defined by the valve body and a spool assembly disposed within the spool chamber; the spool assembly further comprising a spool sleeve, a biasing member, a spool having a plurality of indents, a plurality of sealing mechanisms, and a plurality of spacers; wherein each of the plurality of spacers is separated by a sealing mechanism of the plurality of sealing mechanisms; wherein at least one spacer of the plurality of spacers is in fluid communication with at least one of port A, port B, port C, or port F; and wherein the spool is translated within the spool sleeve in response to an air pressure of the air supply.

Statement 25. The pneumatic trip valve of statement 24 wherein an indent of the plurality of indents is positioned proximal to at least one spacer of the plurality of spacers during translation of the spool.

Statement 26. The pneumatic trip valve of statement 25, wherein the indent facilitates fluid communication between two or more spacers after translation of the spool during a fail-safe operation.

Statement 27. The pneumatic trip valve of statement 24 further comprising a switch plate that further defines a switch plate air path providing fluid communication between the first internal air path and the spool chamber.

Statement 28. The pneumatic trip valve of statement 24 wherein the spool is translated within the spool sleeve in response to a decrease in air pressure and wherein the pneumatic trip valve assumes the fail-safe configuration.

Statement 29. The pneumatic trip valve of statement 24 wherein the spool is translated within the spool sleeve in response to an increase or return of air pressure and wherein the pneumatic trip valve assumes the normal configuration.

Statement 30. The pneumatic trip valve of any one of statements 1-29 wherein the decrease of the air supply received at the first port comprises a decrease in air pressure below a minimum threshold.

Statement 31. The pneumatic trip valve of statement 30 wherein the minimum threshold is in a range between 0-150 psi.

Statement 32. The pneumatic trip valve of statement 1 further comprising a shuttle valve in fluid communication with the valve body.

Statement 33. The pneumatic trip valve of any one of statements 1-32 wherein the first internal air path is in communication with a second port.

Statement 34. A fluid control system comprising a pneumatic trip valve, an actuator, a control valve and a positioner; the system comprising: the pneumatic trip valve further comprising: a valve body further comprising: a first internal air path in communication with a first port; a second internal air path in communication with the first internal air path, wherein the first internal air path and the second internal air path are in fluid communication through a check valve; a first three-way valve; and, a second three-way valve; and, wherein the first three-way valve and the second three-way valve assume an normal operational configuration when an air supply is provided to the first port; and, wherein the first three-way valve and the second three-way valve assume a fail-safe configuration in response to a decrease of the air supply received at the first port.

Statement 35. The fluid control system of statement 34, wherein the actuator is in fluid communication with at least one of the valve body or the control valve.

Statement 36. The fluid control system of statement 34, wherein the first three-way valve comprises a port A, a port B, and a port C, and the second three-way valve comprises a port D, a port E, and a port F.

Statement 37. The fluid control system of statement 34, wherein: Port A is in fluid communication with the positioner; Port B is in fluid communication with the actuator; Port C is exhausted to an atmosphere; Port D is in fluid communication with the positioner; and Port E is in fluid communication with the actuator.

Statement 38. The fluid control system of statement 36, wherein Port F is sealed with a plug or in fluid communication with an onboard air reservoir.

Statement 39. The fluid control system of statement 38, wherein the onboard air reservoir is integrated with at least one of the positioner or the actuator.

Statement 40. The fluid control system of any one of statements 34-39 wherein the first internal air path is in communication with a second port.

Based on the description of the above embodiments, when we can fully understand the operation, use and effects of this creation, but the above embodiments are only the preferred embodiments of this creation, and this should not be limited by this. The scope of implementation of the creation, that is, simple equivalent changes and modifications based on the scope of the patent application for this creation and the content of the creation description, are all within the scope of this creation.

The invention claimed is:

1. A pneumatic trip valve comprising:
  a valve body further comprising:
    a first internal air path in communication with a first port;
    a second internal air path in communication with the first internal air path,
      wherein the first internal air path and the second internal air path are in fluid communication through a check valve;
    a first three-way valve; and,
    a second three-way valve; and,
  wherein the first three-way valve and the second three-way valve assume a normal operational configuration when an air supply is provided to the first port; and,
  wherein the first three-way valve and the second three-way valve assume a fail-safe configuration in response to a decrease of the air supply received at the first port below a minimum threshold.

2. The pneumatic trip valve of claim 1 wherein the first three-way valve comprises a Port A, a Port B, and a Port C, and the second three-way valve comprises a Port D, a Port E, and a Port F.

3. The pneumatic trip valve of claim 2 wherein the Port F is in fluid communication with the second internal air path.

4. The pneumatic trip valve of claim 1 further comprising an external reservoir port.

5. The pneumatic trip valve of claim 2 wherein the normal operational configuration comprises providing fluid communication between the Port A and the Port B and fluid communication between the Port D and the Port E.

6. The pneumatic trip valve of claim 2 wherein the fail-safe configuration comprises providing fluid communication between the Port B and the Port C.

7. The pneumatic trip valve of claim 6, wherein the Port B is also in fluid communication with the Port A.

8. The pneumatic trip valve of claim 2 wherein the fail-safe configuration comprises providing fluid communication between the Port E and the Port F.

9. The pneumatic trip valve of claim 8, wherein the Port E is also in fluid communication with the Port D.

10. The pneumatic trip valve of claim 1, wherein the first internal air path is in fluid communication with a main air supply.

11. The pneumatic trip valve of claim 2, wherein the second internal air path is in fluid communication with a reservoir air supply.

12. The pneumatic trip valve of claim 11, wherein the reservoir air supply is an onboard air reservoir integrated with the pneumatic trip valve.

13. The pneumatic trip valve of claim 11, wherein the reservoir air supply is an onboard air reservoir integrated with an actuator or a positioner.

14. The pneumatic trip valve of claim 13, wherein:
  the Port A is in fluid communication with the positioner;
  the Port B is in fluid communication with the actuator;
  the Port C is exhausted to an atmosphere;
  the Port D is in fluid communication with the positioner; and
  the Port E is in fluid communication with the actuator.

15. The pneumatic trip valve of claim 14, wherein the Port F is sealed with a plug or in fluid communication with an onboard air reservoir.

16. The pneumatic trip valve of claim 12, wherein the onboard reservoir air supply is in fluid communication with the Port F.

17. The pneumatic trip valve of claim 11, wherein the reservoir air supply is an external stand-alone air reservoir.

18. The pneumatic trip valve of claim 17, wherein the external stand-alone air reservoir is in fluid communication with an external air reservoir port of the pneumatic trip valve.

19. The pneumatic trip valve of claim 13, wherein the onboard reservoir air supply is in fluid communication with an external air reservoir port of the pneumatic trip valve.

20. The pneumatic trip valve of claim 19, wherein:
  the Port A is in fluid communication with the positioner;
  the Port B is in fluid communication with the actuator;
  the Port C is exhausted to an atmosphere;
  the Port D is in fluid communication with the positioner; and
  the Port E is in fluid communication with the actuator.

21. The pneumatic trip valve of claim 17, wherein the Port F is sealed with a plug or in fluid communication with an onboard air reservoir.

22. The pneumatic trip valve of claim 21, wherein the onboard air reservoir is integrated with at least one of a positioner or an actuator.

23. The pneumatic trip valve of claim 1 wherein the check valve is disposed within the valve body.

24. The pneumatic trip valve of claim 2 further comprising:
  a spool chamber defined by the valve body and a spool assembly disposed within the spool chamber;
  the spool assembly further comprising a spool sleeve, a biasing member, a spool having a plurality of indents, a plurality of sealing mechanisms, and a plurality of spacers;
  wherein each of the plurality of spacers is separated by a sealing mechanism of the plurality of sealing mechanisms;
  wherein at least one spacer of the plurality of spacers is in fluid communication with at least one of the Port A, the Port B, the Port C, or the Port F; and
  wherein the spool is translated within the spool sleeve in response to an air pressure of the air supply.

25. The pneumatic trip valve of claim 24 wherein an indent of the plurality of indents is positioned proximal to at least one spacer of the plurality of spacers during translation of the spool.

26. The pneumatic trip valve of claim 25, wherein the indent facilitates fluid communication between two or more spacers after translation of the spool during a fail-safe operation.

27. The pneumatic trip valve of claim 24 further comprising a switch plate that further defines a switch plate air path providing fluid communication between the first internal air path and the spool chamber.

28. The pneumatic trip valve of claim 24 wherein the spool is translated within the spool sleeve in response to a decrease in air pressure and wherein the pneumatic trip valve assumes the fail-safe configuration.

29. The pneumatic trip valve of claim 24 wherein the spool is translated within the spool sleeve in response to an increase or return of air pressure and wherein the pneumatic trip valve assumes the normal configuration.

30. The pneumatic trip valve of claim 1 wherein the decrease of the air supply received at the first port comprises a decrease in air pressure below a minimum threshold.

31. The pneumatic trip valve of claim 30 wherein the minimum threshold is in a range between 0-150 psi.

32. The pneumatic trip valve of claim 1 further comprising a shuttle valve in fluid communication with the valve body.

33. The pneumatic trip valve of 1 wherein the first internal air path is in communication with a second port.

34. A fluid control system comprising a pneumatic trip valve, an actuator, a control valve and a positioner; the system comprising:
the pneumatic trip valve further comprising:
a valve body further comprising:
a first internal air path in communication with a first port;
a second internal air path in communication with the first internal air path, wherein the first internal air path and the second internal air path are in fluid communication through a check valve;
a first three-way valve; and,
a second three-way valve; and,
wherein the first three-way valve and the second three-way valve assume a normal operational configuration when an air supply is provided to the first port; and,
wherein the first three-way valve and the second three-way valve assume a fail-safe configuration in response to a decrease of the air supply received at the first port.

* * * * *